US011724820B2

(12) United States Patent
Sellmann et al.

(10) Patent No.: US 11,724,820 B2
(45) Date of Patent: Aug. 15, 2023

(54) DECISION-SUPPORT SYSTEM FOR AIRCRAFT REQUIRING EMERGENCY LANDINGS

(71) Applicant: GE Aviation Systems LLC, Grand Rapids, MI (US)

(72) Inventors: Meinolf Sellmann, Niskayuna, NY (US); Tianyi Wang, Niskayuna, NY (US); Paul E. Cuddihy, Niskayuna, NY (US); Varish V. Mulwad, Glenville, NY (US)

(73) Assignee: GE Aviation Systems LLC, Grand Rapids, MI (US)

(*) Notice: Subject to any disclaimer, the term of this patent is extended or adjusted under 35 U.S.C. 154(b) by 142 days.

(21) Appl. No.: 17/134,139

(22) Filed: Dec. 24, 2020

(65) Prior Publication Data
US 2022/0204180 A1 Jun. 30, 2022

(51) Int. Cl.
*B64D 45/08* (2006.01)
*B64D 43/00* (2006.01)
*B64D 45/00* (2006.01)
*G01C 23/00* (2006.01)
*G05B 17/02* (2006.01)
*G08G 5/00* (2006.01)
*G08G 5/02* (2006.01)

(52) U.S. Cl.
CPC ............ *B64D 45/08* (2013.01); *B64D 43/00* (2013.01); *B64D 45/00* (2013.01); *G01C 23/005* (2013.01); *G05B 17/02* (2013.01); *G08G 5/0039* (2013.01); *G08G 5/0056* (2013.01); *G08G 5/025* (2013.01)

(58) Field of Classification Search
CPC combination set(s) only.
See application file for complete search history.

(56) References Cited

U.S. PATENT DOCUMENTS

| 7,167,782 B2 | 1/2007 | Humbard |
| 8,666,643 B2 | 3/2014 | McBride |
| 8,676,481 B2 | 3/2014 | Coulmeau |
| 8,843,303 B1 | 9/2014 | Young |

(Continued)

FOREIGN PATENT DOCUMENTS

| EP | 2561501 A2 | 3/2011 |
| EP | 3101642 A1 | 12/2016 |
| WO | 2011/152917 A2 | 12/2011 |

*Primary Examiner* — Maceeh Anwari
(74) *Attorney, Agent, or Firm* — Wood IP LLC

(57) ABSTRACT

A system and method to assist aircraft pilots with rapid decision-making in cases where the pilot needs to make a flight diversion at low altitudes due to an emergency (for example, loss of thrust). Once an emergency need for diversion is detected, the system and method generates a list of alternative airports the plane can reach given: (i) the current conditions of the plane; (ii) a real-emergency time simulation of evolving conditions of the plane; (iii) the environment at potential landing sites; and (iv) the environment on the flight path to those sites. For airports potentially within reach, the system and method provides a confidence scores for successful landings for alternative simulated landing options. The simulations and confidence scores take into account aircraft position, altitude, speed, and possible further problems with the aircraft for the both the current flight path and for each simulated alternative.

20 Claims, 14 Drawing Sheets

Exemplary Aircraft

(56) References Cited

U.S. PATENT DOCUMENTS

| | | |
|---|---|---|
| 9,064,407 B2 | 6/2015 | Otto |
| 9,257,048 B1 | 2/2016 | Offer |
| 9,646,503 B2 | 5/2017 | Kawalkar |
| 10,096,253 B2 | 10/2018 | Moravek |
| 10,109,203 B2 | 10/2018 | Chmelarova |
| 10,467,913 B1 | 11/2019 | Suiter |
| 11,315,432 B2* | 4/2022 | Schmidt .............. G08G 5/0026 |
| 2014/0309821 A1* | 10/2014 | Poux ................... G08G 5/0021 |
| | | 701/14 |
| 2019/0051189 A1* | 2/2019 | De Villele .......... G08G 5/0034 |

* cited by examiner

Exemplary Method for Scenarios With Alternative Flight Conditions

800

810 — Obtain the aircraft's current flight condition measurements (latitude, longitude, altitude, orientation, air speed, thrust, climb rate, other constraints due to the emergency event).

820 — Obtain the aircraft's current exterior flight environment (wind speed, wind direction, precipitation, and temperature).

830 — Generate sets of alternative flight conditions (further thrust loss, further loss of aircraft structural integrity, further electrical power loss; and variations in the external environment such as wind gusts, wind direction changes, or increases or decreases in precipitation).

840 — For each set of alternative flight conditions, generate one or more sets of landing scenarios.

850 — For each landing scenario, generate one or more flight path simulations and path outcomes.

860 — For each airport, and using the flight path outcomes for each landing simulation, generate a confidence level for a safe landing at each airport.

FIG. 8

DECISION-SUPPORT SYSTEM FOR AIRCRAFT REQUIRING EMERGENCY LANDINGS

TECHNICAL FIELD

The present invention relates to the fields of aviation, event simulation and prediction, and artificial intelligence systems for decision support. The present invention further relates to providing real-time emergency event modeling, and to evaluating different potential safe landing options, to support an aircraft pilot who is responding to a flight emergency.

BACKGROUND

On aircraft, including but not limited to airplanes, various emergency situations can arise in the course of what is expected to be a routine flight.

In particular, in the course of flight at low altitudes (for example, during take-off or landing), an aircraft may experience an emergency involving a sudden reduction in the thrust generated by the engines. A reduction or loss of engine power may necessitate an unexpected and time-critical diversion from the expected flight path to a safe, previously unplanned local landing site.

The most severe situations may require the pilot to attempt to land the aircraft on any proximate flat, extended surface on the ground with suitable wing clearance (such as a nearby highway), with all the grave risks of crash and of injury to persons on the aircraft and on the ground. However, other emergency situations, while still severe, allow sufficient operational latitude for a pilot to seek out a nearby airport, thereby attempting a more conventional and safe landing.

In legacy aircraft, when an aircraft encounters an emergency requiring an imminent and unexpected landing, the aircraft pilot may rely on air traffic controllers to provide necessary information pertaining to possible landing sites. The air traffic controller can manually integrate/federate data from different sources to provide the appropriate response. The air traffic controller can also run simulations on a computer system at their end to calculate aircraft reach. However, relying on ground controllers, ground control research, and simulations initiated/run by ground controllers all entail time delay; this time delay can have a significant impact in cases of emergency, and reduce the likelihood of a safe aircraft landing.

There exist legacy, on-board systems for automatically landing a plane that include a selection of possible landing sites. However, these legacy systems assume a fully capable aircraft. They do not incorporate environmental conditions (such as wind direction, wind speed, visibility, or precipitation), nor do these on-board legacy systems factor in the condition of the aircraft itself. Legacy systems also do not: (i) run simulations to assess likelihood of success for different potential landing sites; (ii) do not assist a pilot in making any decisions pertaining to the landing, but rather take over control of the plane entirely. The legacy systems are defined in view of a problem which assumes a functional airplane but a compromised pilot ("good plane, compromised pilot").

What is needed, then, is a system and method for a "compromised plane, good pilot" situation. Such a solution provides on-board emergency landing decision support to assist a landing made by a pilot whose performance is not compromised; and where the system and method provides such support in situations where the aircraft is partially compromised and the only viable option is an emergency landing.

SUMMARY OF THE INVENTION

This present system and method (referred to herein by several terms including Low Altitude Diversion Assistant (LADA)) which assists pilots with their decision-making in cases where they need to make a diversion at low altitudes due to an emergency (e.g. loss of thrust).

Once an emergency and associated need for diversion is detected, the system generates a list of alternative airports the plane can reach given the current conditions of the plane, and a simulation of proximate future conditions of the plane; the simulations also account for the environment at potential landing sites, and the environment on the flight path to those sites. For airports within reach, the system provides a "confidence score" which reflects the percentage of computer simulations that, at the current point in time, lead to a successful landing, as well as the rate of change of this confidence over time if the current course of the aircraft is not altered, whereby position, altitude, and speed are expected to change in accordance with the current course and general state of the aircraft.

In various embodiments of the present system and method, one or more of the following elements may be present, synergistically contributing to rapid digital situation assessment and pilot support:

(a) Pre-flight data collection for database information (such as information on specific airports) suitable for the planned flight path;

(b) Proactive scenario evaluation for the simulation of different alternative landing scenarios, which may include any or all of: (i) pre-flight simulations, (ii) in-flight simulations prior to any emergency situation, and (iii) automatically initiated simulations which are triggered by initial signs of possible low-altitude flight problems.

(c) Semantic data federation: Many diverse types of flight-related data may be required for the present system and method, including for example and without limitation: flight path data, flight operations plans, aircraft operations, weather and other environmental conditions, airport ground operations, and airport geography. Semantic data federation is a type of data processing to ensure that all of these different types of data—which may be culled from separate database sources—are suitably defined and/or formally translatable for logical linking, logical comparisons, and logical analysis as required for the present system and method. Semantic federation may include/entail appropriate queries for and retrieval of all relevant input parameter values for the Low Altitude Diversion algorithms, when such parameters are obtained from heterogeneous traditional and non-traditional data sources.

(d) Concise, immediately understandable presentations of landing solutions to pilots, including a prioritized listing of alternative solution strategies, with dynamically updated parameters indicative of risk levels and various possible trade-offs in expected outcomes.

These and other features and benefits of the present system and method will become apparent from the more detailed discussion presented below.

BRIEF DESCRIPTION OF THE DRAWINGS

Advantageous designs of embodiment of the present invention result from independent and dependent claims, the description, and the drawings. In the following, various examples of embodiments of the invention are explained in detail with the aid of the attached drawings:

FIG. 8 presents a flow chart of an exemplary method for generating emergency landing simulations taking into account changing flight/aircraft emergency conditions, according to the present system and method.

DETAILED DESCRIPTION OF EXEMPLARY EMBODIMENTS

Figure 1:
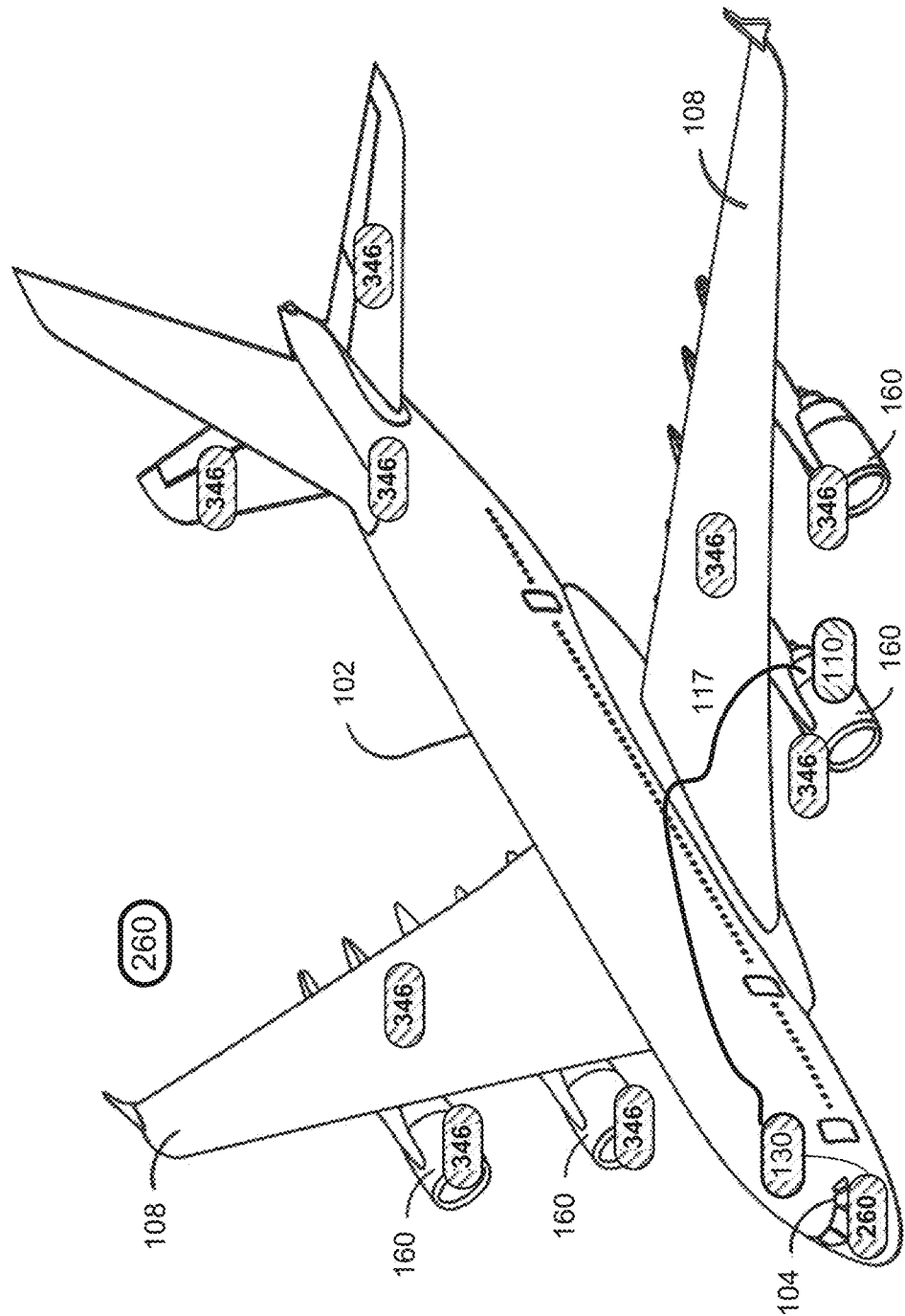
FIG. 1 illustrates an exemplary aircraft according to the present system and method.

The following detailed description is merely exemplary in nature and is not intended to limit the system and methods, nor the elements or steps of the system and method, nor its applications, and its uses disclosed herein. Further, there is no intention for the scope to be bound or limited to or by any theory presented in the preceding background or summary, nor in the following detailed description.

I. Terminology, Multiple Embodiments, and Scope

It will be understand in this document that:

Description of various embodiments may use "comprising" language, indicating that the system and method may include certain elements or steps which are described; but that the system and method may also include other elements or steps which are not described, or which may be described in conjunction with other embodiments, or which may be shown in the figures only, or those which are well known in the art as necessary to the function of processing systems. However, it will be understood by one of skilled in the art that in some specific instances, an embodiment can alternatively be described using the language "consisting essentially of" or "consisting of."

A Low Altitude Diversion (LAD) is an event and/or an action in which an aircraft experiences an emergency when flying at a low altitude (typically shortly after take-off or as a scheduled landing attempt is already in progress), where the nature of the emergency requires that the aircraft be diverted from its original, intended flight path in order to make a safe landing.

The present system and method may be referred to by several fully equivalent terms, all having the same scope, and all presented in this document in various embodiments which are exemplary only and are not limiting. The terms for the system and method taught herein may include: "Low Altitude Diversion Assistant", "Low Altitude Aircraft Diversion System and Method," "System and Method for Emergency Aircraft Diversion", "Decision-Support System for Aircraft Requiring Emergency Landings", and "Landing Diversion Assistant."

In conjunction with some embodiments disclosed herein, additional phases or substitutions may be included when referring to the system and method (for example " . . . artificial intelligence [System/Method] . . . ", " . . . real time . . . ", " . . . on-board . . . ", and " . . . interactive . . . "; or " . . . Aide . . . " in place of " . . . Assistant . . . ").

Also, at some points and as an aide to understanding, rearrangements of words or phrasings, or concatenations, may be employed as well, for example, "Diversion Assistant", "Decision Aiding Assistant", "Landing Diversion Assistant", or "Support Aide for Emergency Landings". Acronyms may also be employed—"LADA" ("Low Altitude Diversion Assistant"), "LDA" ("Landing Diversion Assistant"), or "DSSAREL" for "Decision-Support System for Aircraft Requiring Emergency Landings".

It will be understood that a name or label employed in relation to any particular embodiment or with multiple embodiments is descriptive but not limiting. Further, some phrases employed may be descriptive of many embodiments but not necessarily all embodiments of the present system and method.

Probabilities: As taught herein, the present system and method employs "probabilities" in several different forms.

Path conditions probability 690: One form of probability is a path conditions probability 690, discussed in detail in conjunction with FIG. 6 and elsewhere in this document. A path condition probability 690 is a probability that certain environmental conditions 504 and/or aircraft conditions 504 will prevail or predominate during an emergency landing situation. (Such conditions 504 may include air speed, thrust, temperature, and other factors discussed further below.) Anyone such set of environmental conditions 504, with an associated probability, may be employed as part of determining a simulation of a potential landing path 580. A path conditions probability 690 may be considered as an input for calculations to present methods, or as an intermediate calculation in the course of present methods.

Confidence level 392/Airport reachability 392: A second form of probability may be referred to as any of a safe landing probability 392, as a confidence level 392, or as an airport reachability 392. A confidence level/airport reachability 392 refers to a calculated likelihood that a particular destination airport 555 will result in a safe landing for the aircraft 100. The safe landing probability 392, airport reachability, or confidence level 392 is generally an output or result of the calculations of the present system and method. This is again discussed in detail further below.

Real-time and real-emergency time: As used in this document, "real-time" generally connotes digital calculations or processing based on currently obtain data, such as real-time aircraft conditions (location, direction, thrust or power level, etc.), or real-time environmental conditions (wind speed, etc.). That is to say, the required data is obtained substantially simultaneous to the processing of the data.

"Real-emergency time" generally refers to a time duration of a flight emergency (from identification of the emergency through to final outcome, hopefully a safe landing), or to a shorter time duration within the span of the flight emergency; and further to a requirement to perform multiple flight landing path simulations within a time frame (typically in seconds, from five seconds to possibly a minute) consistent with identifying possible landing sites well before the aircraft must land. In colloquial terms, "real-emergency time" means that the present system and method is directed to supporting pilots and their landing decisions via suggested landing options, which are quickly identified by a computational system in the context of the real-time of the emergency, when the pilots have only a few minutes to achieve a safe emergency landing.

General: It will be generally understood that different embodiments of the present system and method, and different elements of different embodiments, may be combined in various ways not specifically disclosed. At points, elements or embodiments may be referred to only as "system" or only as "method", where one or the other such term may be most readily applicable in a specific context; but it will be understood that this disclosure teaches multiple embodiments of an integrated system and method.

The scope of the present system and method is therefore not limited by any system and method names/titles employed herein, nor limited to the exemplary embodiments taught in the written disclosure and figures. The scope of the present system and method is defined by the appended claims.

II. Exemplary Aircraft and Processing System

FIG. 1 illustrates an exemplary aircraft 100 according to the present system and method. The aircraft 100 may include a fuselage 102, a cockpit 104 positioned in the fuselage 102, and wing assemblies 108 extending outward from the fuselage 102. The aircraft 100 can also include multiple engines 160. While a commercial fixed wing aircraft 100 has been illustrated, it is contemplated that aspects of the disclosure described herein can be used in any type of fixed wing, rotary wing, or convertible wing aircraft.

Controllers and Avionics: The aircraft 100 may include one or more general aircraft controllers 130, together referred to as the avionics suite 130, which may be digital controllers 130 with microprocessor(s) and memory. The aircraft engines 160 may include one or more engine controllers 110 which may be Full Authority Digital Controllers 110 (FADECS). Suitable internal communications links 117 (electrical, fiber optic or wireless) enable digital and possibly analog communications between the avionics suite 130 and the FADECS 110. Pilots controls and visual displays 260 are linked to the avionics suite 130. The controller also interfaces with various aircraft sensors 346 to obtain operational status of the aircraft 100.

Figure 2:
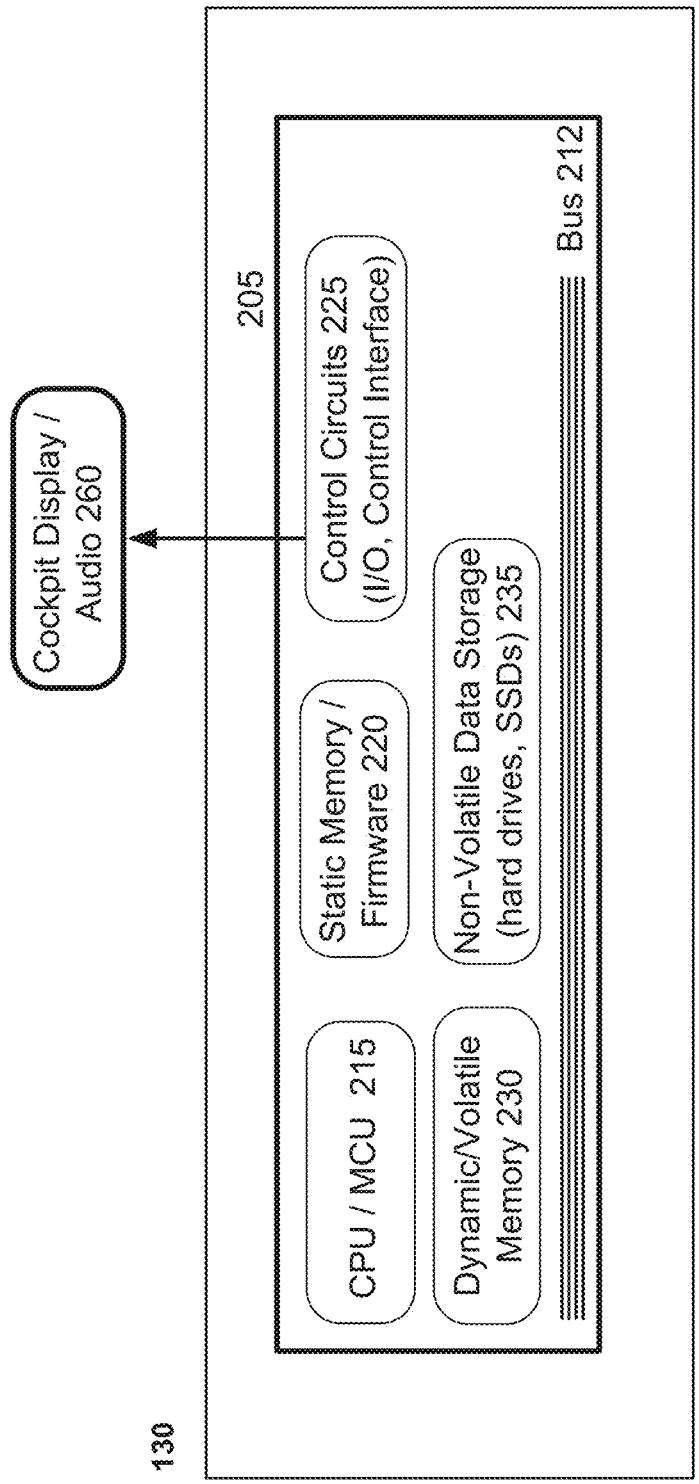
FIG. 2 presents a block diagram of an exemplary aircraft controller which may be employed according to the present system and method.

FIG. 2 presents a block diagram or system level diagram of an exemplary controller 130, such as a digital computer, which may be employed according to the present system and method. Digital controller 130 may implement or execute, for example, computer code (software or firmware) which enables the aircraft to perform the decision supports methods and related methods presented in this document.

The controller 130 typically has a motherboard 205 which typically holds and interconnects various microchips 215/220/225, and volatile and non-volatile memory or storage 230/235, which together enable at the hardware level the operations of the controller 130 and also enable the operations of the present system and method. Controller 130 may include, for example and without limitation:

A hardware microprocessor 215, also known as a central processing unit (CPU) 215 or microcontroller (MCU) 215, which provides for overall operational control of the controller 130. This includes but is not limited to receiving data from data files or from connections to other computers, receiving data from a target hardware platform, and sending data or files to a target hardware platform. Microprocessor 215 is also configured to perform the arithmetic and logical operations necessary to implement the present system and method.

Static memory or firmware 220 may store non-volatile operational code, including but not limited to operating system code, computer code for locally processing and analyzing data, and computer code which may be used specifically to enable the controller 130 to implement the methods described in this document and other methods within the scope and spirit of the appended claims. CPU 215 may employ the code stored in the static memory 220 and/or dynamic memory 230 and/or non-volatile data storage 235 to implement the methods described in this document and other methods.

Control circuits 225 may perform a variety of tasks, including data and control exchanges, as well as input/output (I/O) tasks, network connection operations, control of the bus 212, and other tasks generally known in the art of processing systems. Control circuits 225 may also control or interface with non-volatile data storage 235, and interface with aircraft sensors 346.

Control circuits 225 may also support such functions as external input/output (for example, via USB ports, an Ethernet port, or wireless communications, not illustrated in the figure).

Volatile memory 230, such as dynamic RAM (DRAM), may be used to temporarily store data or program code. Volatile memory 230 may also be used to temporarily store some or all of the code from static memory 220.

Non-volatile storage 235 may take the form of hard disk drives, solid state drives (including flash drives and memory cards), recording on magnetized tape, storage on DVD or similar optical disks, or other forms of non-volatile storage now known or to be developed.

A system bus 212 provides for data communications among the CPU 215, memory 220, 230, and non-volatile data storage 235. A cockpit informational system 260, which may be visual (a display screen or visual projection), audio, or both, may be integrated into or communicatively coupled with the controller 130, so as to present flight data to a pilot or co-pilot of the aircraft. The flight data presented via the cockpit informational system 260 may include, among other elements, the emergency flight landing options 350 (see FIG. 3, below) of the present system and method.

Voice, mechanical, or tactile input means (260) may also be communicatively coupled with the controller 230, so that the pilot or copilot may select or alter operations of the controller 130 (and thereby also possibly select or alter operations of the aircraft 100).

III. Systems and Methods for Decision Support for Low-Altitude Aircraft Diversion Overview of the Problem: Flight Emergencies and Aircraft Diversions The present system and method pertains to the safety of air transit vehicles, and in embodiments discussed here pertains to the safety of aircraft. Persons skilled in the relevant arts will recognize that the system and method, in other embodiments not disclosed here in detail, is also suited for other forms of air transport such as helicopters.

An airline in flight normally has a planned, scheduled flight route, taking off from a first, known airport, traveling mostly or entirely via a pre-planned route (possibly with some route variations necessitated by unexpected weather, or other aviation emergencies of nearby aircraft, and then landing at a second, designated airport.

Occasionally an aircraft encounters in-flight emergencies or disruptions. In some cases these are severe enough to completely disable an aircraft, and loss of the aircraft and the lives on-board is essentially unavoidable.

Fortunately, most aircraft emergencies are less severe. Significant-but-moderate emergencies (SBSEs) may, for example and without limitation, entail: limited damage due to storms; unexpected subsystem failures or degradation due to engine wear-and-tear, errors or "bugs" in new or upgraded software, or electrical system breakdowns; small fires; compromised integrity or safety of the interior cabin or cockpit; identification of dangerous baggage or luggage; sudden passenger illness or injury; encounters with birds which enter the engines; environmental temperatures outside an anticipated range (which may for example cause excess icing on the wings); and/or other factors which impede aircraft performance and/or pilot control of the craft, or which pose a safety or health risk for passengers and crew.

Such SB SE's may be severe enough to pose a risk for sustained flight to the intended airport destination. At the same time, an SB SE event may not immediately cripple or disable the aircraft, so that a safe landing may still be attempted at least for the short-term. Many SBSEs are of such a nature, however, that aircraft systems may degrade with time, requiring that a landing be made as soon as possible at the safest possible nearby landing sight (typically an airport other than the intended destination airport).

If an SBSE occurs when an airplane is flying at high altitude (for example, at cruising altitude), the pilot and ground control may have sufficient time for a dialog to consider various potential alternative landing sites (airports closer than the intended target, but still some distance away). Even with such high altitude diversions, the present system and method may be useful for assisting/augmenting pilot-ground control decisions regarding flight diversions.

Some SBSE events may occur when an airplane is at much lower altitudes, for example shortly after aircraft take-off or as the craft is at least starting it's landing approach. A low-altitude emergency, and especially those which place the aircraft at imminent risk of losing flight capabilities, may not permit time for pilot-ground control dialog. Further, in such time-sensitive situations, a pilot has little time to identify and then prioritize alternative landing options.

Exemplary Landing Diversion Assistant (LADA)

The present system and method may be referred to as a Landing Diversion Assistant (or "LDA") 300, or by other terms as described above. The LDA 300 is implemented via suitable information-processing hardware and suitable processing algorithms, supported by appropriate databases and real-emergency-time data—as described further below— which together are configured to provide intelligent, rapid decision support for an aircraft pilot who needs to quickly assesses different landing options in an emergency.

In some embodiments of the present system and method the decision support is presented to a pilot in real time in perceptible form (visual presentation and/or audio presentation). However, in some alternative embodiments, some elements of decision support may entail the LDA 300 taking some automatic actions (for example, initiating activation or triggering deactivation of certain aircraft systems) without prior perceptible presentation to or authorization by the pilot. Such automatic actions may be taken, for example, in anticipation of a pilot possibly selecting certain emergency options. For example, more than one set of landing coordinates (for more than one airport) may be automatically programmed into an autopilot, in anticipation of a human pilot then selecting one airport from among several landing options which are presented to the pilot.

Figure 3:
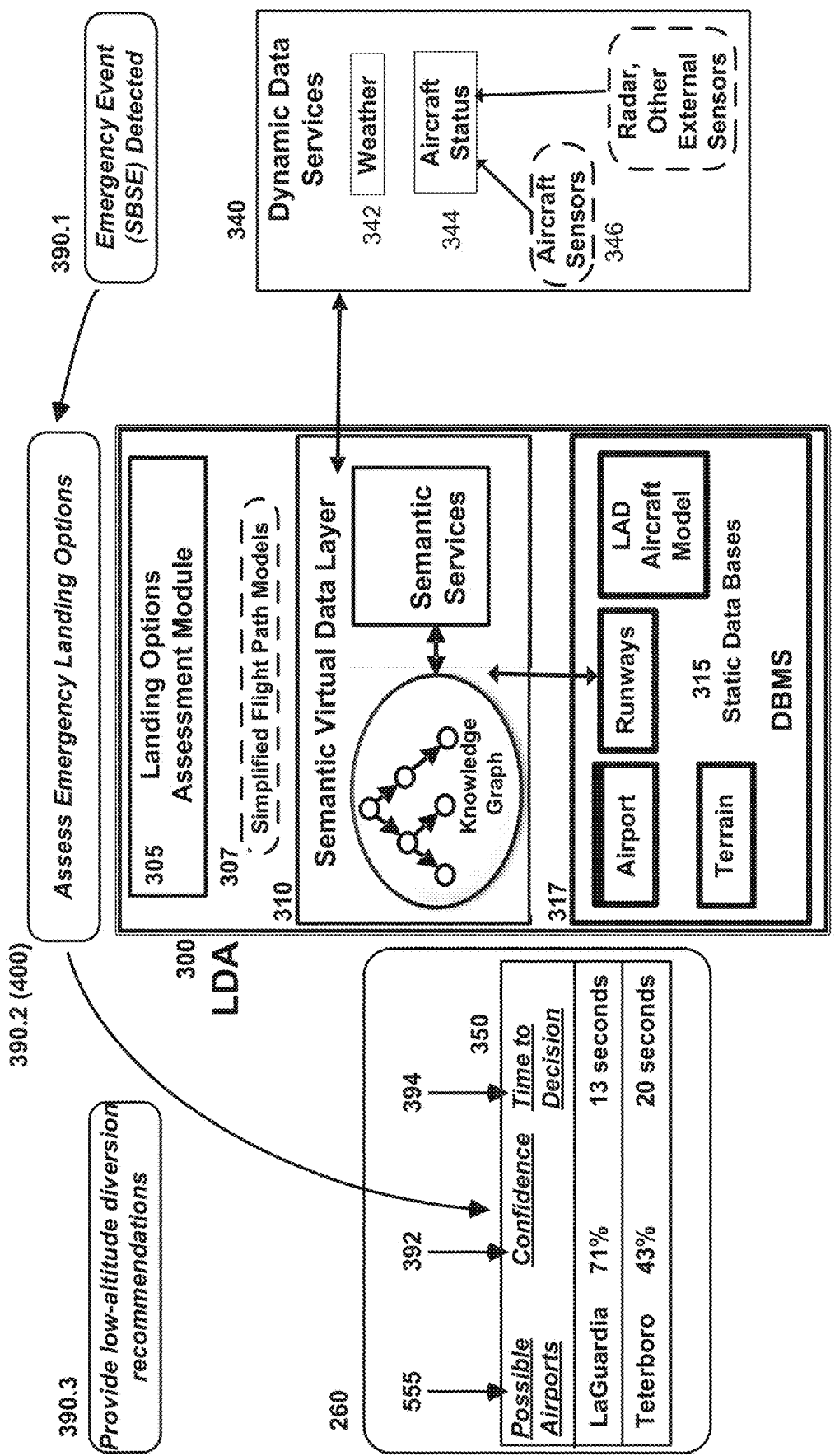
FIG. 3 presents both a block-level system diagram of an exemplary Landing Decision Assistant (LDA) and an exemplary method for assessing emergency landing options.

FIG. 3 presents both a block-level system diagram of an exemplary Landing Decision Assistant (LDA) 300 and an exemplary method 390 for assessing emergency landing options.

The exemplary elements of the LDA 300 include software modules (possibly implemented as firmware), processing algorithms, data storage, and data storage and retrieval algorithms, which are understood to be implemented and run via a digital processing system 130 such as that illustrated above (FIG. 2). In exemplary embodiments, and unless otherwise noted, the LDA 300 hardware (including processing system 130) and software/firmware, and at least some of the associated database storage, are all local to (that is, on-board and integrated into) the aircraft 100.

Method: Exemplary method 390 entails the following steps:

Step 1: In a first step 390.1, LDA 300 identifies an emergency event, also referred to as a significant but survivable emergency (SBSE) as discussed above. As is known in the art, aircraft 100 are deployed with a wide variety of sensors 346 to determine all of: aircraft integrity; aircraft systems operational status; flight status (speed, altitude, direction, etc.); and exterior environmental status (wind speed, temperatures, humidity, etc.). Based on real-time sensor data, one or more aircraft health monitoring systems (HMS) (not shown in FIG. 3) are configured to assess overall flight status and to identify SBSE events. Such systems are generally known in the art, and further details are not presented in this document.

Step 2: In a second step 390.2, and in response to the SBSE detected in step 390.1, the LDA 300 assesses available options for an emergency landing for the aircraft 100. The assessment is done in part by simulating multiple possible landing options, which may include choices among several local airports, and choices of different flight paths to any one local airport. The results of the assessment are typically multiple different low-altitude diversion recommendations 350. For each diversion recommendation the LDA 300 identifies a confidence level 392 that the selected option (that is, the selected target airport 555) will lead to a safe landing.

The LDA 300 typically identifies these options within a few seconds of detecting the SBSE, and then continually updates the options and confidence levels in real-emergency time, for example once a second, or once every two to five seconds. Because the landing options 555 are likely to be very close to the aircraft 100, and also because flight conditions and/or operational status may be rapidly declining by the second, the LDA 300 may also identify, for each landing option, a decision time 394 (number of seconds) available to a pilot to actually choose and implement that option. For the same reasons, the LDA 300 may further identify and estimated confidence score decay time, which indicates how quickly any one option may lose viability.

Details of the assessment process are presented further below in this document. Updated assessments are evaluated as an ongoing process, in real time, until the aircraft has landed safely.

Step 3: In step 390.3, and in one embodiment of the present system and method, the LDA 300 may present low altitude diversion recommendations 350 to the pilot or co-pilot via the cockpit display/audio system(s) 260.

In an alternative embodiment, the LDA 300 may take some automated corrective or control actions with respect to the aircraft 100, or make automated transmissions from the aircraft 100, responsive to the low altitude diversion recommendations 350.

As just one example, which is not limiting, the LDA 300 may determine that the highest confidence landing option(s) require that the aircraft landing gear be lowered immediately, without delay; upon such a determination, the LDA 300 may automatically attempt to extend the landing gear even before a pilot has selected a particular option. As another example, which is not limiting, the LDA 300 may determine that the highest confidence landing option(s) require that the aircraft wing flaps be immediately raised (or lowered), without any delay, to provide the highest likelihood of safe landing for the high confidence options; upon such a determination, the LDA 300 may automatically attempt to adjust the position of the wing flaps even before a pilot has selected a particular landing option.

The division and order of the steps above is exemplary only, and in some cases certain steps may be performed in parallel or in alternative orders, consistent with the present system and method.

LDA Modules: In one embodiment of the present system and method, the LDA 300 may include several processing modules which work together to simulate possible emergency landing scenarios 685 and to further provide for estimates of the confidence levels 392 and decision times 394 for various emergency landing options. The modules may be implemented as software and/or firmware which together direct the CPU/MCU 215 to perform the necessary calculations and analyses.

In some embodiments, a Landing Options Assessment Module (LOAM) 305 running on the processor 215 performs the required logical and mathematical calculations for the assessments. Exemplary details of exemplary logical calculations and analyses are presented further below in this document.

To provide real-emergency time options and estimates for emergency landing options, the LOAM 305 may require various static input data 315 which may include, for example and without limitation:

>>airport data—locations and capabilities of nearby airports;

>>airport layouts—runway layouts and facility layouts for the nearby airports;

>>terrain data for the geographic area(s) in proximity to the aircraft and in proximity to the nearby airports, including potential landing sites other than airport runways;

>>other nearby potential support services (for example, hospitals, fire stations, marine rescue services); and >>aircraft model—design and configuration data, and operational capabilities and limitations, for the current aircraft, also referred to as an aircraft model.

The LOAM 305 may also require various dynamic input data 340 which may include, for example and without limitation:

>>real-time local weather data, including temperatures, wind speeds, and storm data, which may be obtained from both on-board aircraft sensors 346 and from remote, third-party weather service reports or airport weather monitoring systems (ground-based or satellite based); and >>real-time aircraft performance and status data 344, which may be obtained in whole or in part from the aircraft's on-board sensors 346; but may also be obtained, in whole or in part, from external data sources such as the radar systems of nearby airports.

Database Management System (DBMS) 317—In one embodiment of the present system and method, static input data 315 (airport, runway, terrain, aircraft model) may be stored in databases maintained within the LDA 300 itself, for example in non-volatile storage 235. The LDA 300 may be configured with a database management system 317 to manage storage and retrieval of the static data. The DBMS 317 may be implemented as any of several standard database management systems known in the art, or as a custom DBMS 317.

Semantic Virtual Data Layer (SVDL) 310—In some embodiments, the current system and method requires both data from the static databases 315 and data from the dynamic data services 340. The dynamic data services 340, which may include vital weather data 342 as well as other real-time environmental data, may be obtained from various third-party reporting services.

As will be understood by persons skilled in the relevant arts, processing all the data in real-emergency time requires that same types of data be in the same data formats, and can be identified (via data field identifiers) as being data of the same types or same data categories. For example, wind-speed data must be identified as wind-speed, temperatures or precipitation data must be identified respectively as temperature and precipitation data. However, there is no guarantee of consistent data identifiers, data labels, or date formats between on-board systems (such as the LDA 300) and off-aircraft systems (such as third-party weather data).

To address this challenge, and in some embodiments, the LDA 300 may employ a semantic virtual data layer (SVDL) 310. The SVDL 310 may employ a variety of methods and algorithms to determine correct data structure and data type matches between diverse data sources. The detailed operations of an exemplary SVDL 310 are beyond the scope of this document, and will not be further presented here.

Simplified Flight Path Models—In an embodiment, the LDA 300 stores one or more simplified flight path models (SFPM) 307, which are used for high-speed simulations of potential landing paths. SFPMs 307 are discussed further below.

Exemplary Method for Determining Emergency Landing Options

Figure 4:
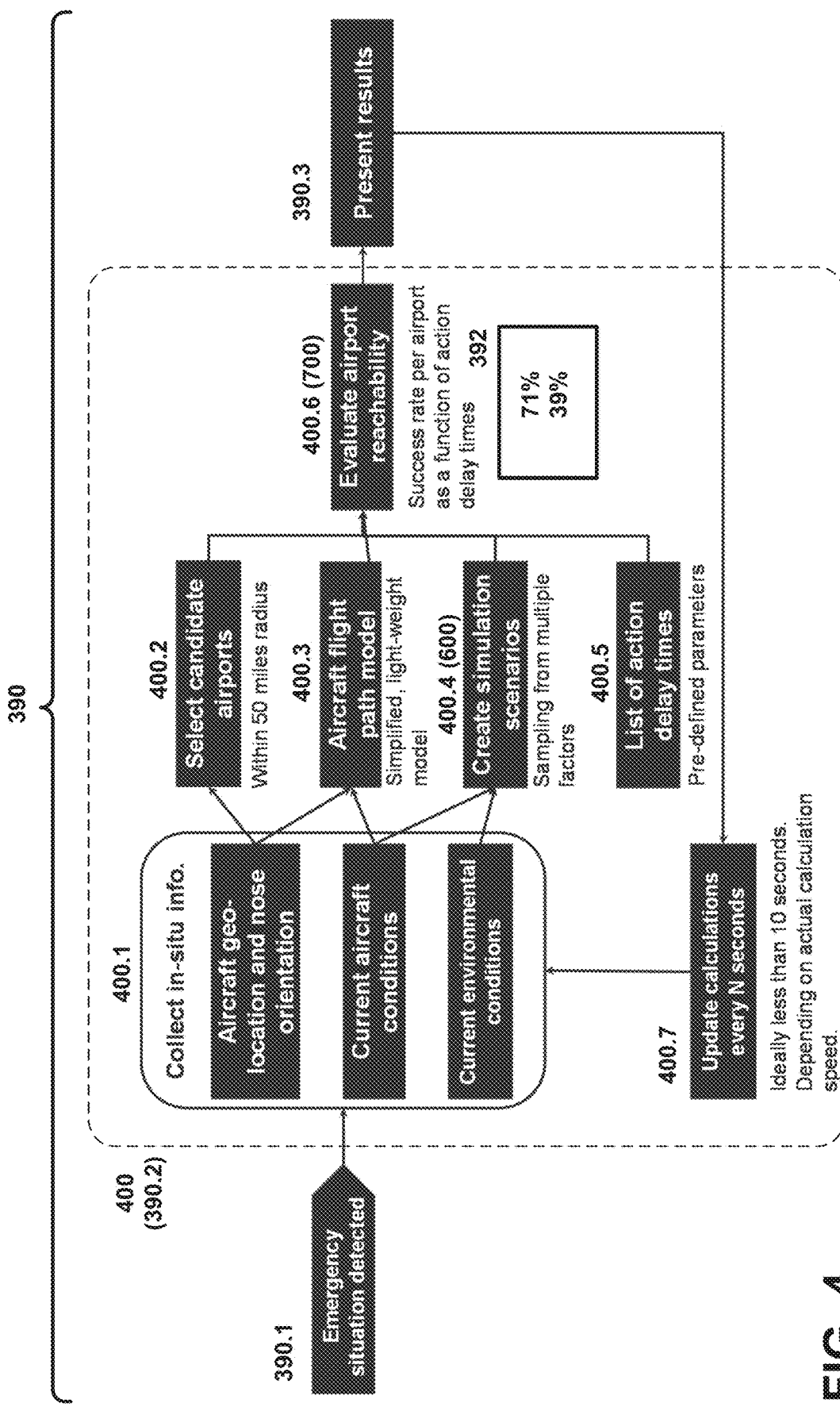
FIG. 4 presents a flow chart of an exemplary method for assessing emergency landing options.

FIG. 4 presents a more detailed flow chart of the exemplary method 390 of FIG. 3 for assessing emergency landing options. Steps 390.1 and 390.3 were already discussed above, and the detailed discussion is not repeated here.

Step 390.2 of method 390 has been relabeled in FIG. 4 as its own method 400 for convenience, with multiple steps 400.*n* (n=1 . . . 7).

Upon the detection of an emergency situation as in step 390.1, method 400 begins with step 400.1. In step 400.1, the landing option of assessments module (LOAD) 305 collects information about the current in-situ aircraft status 504 (see FIG. 5 below). The status information may include, for example and without limitation: the aircraft's geolocation and nose orientation; the current operating conditions of the aircraft itself; and the current weather and other environmental conditions, such as wind speed and precipitation.

Potential Candidate Airports and Plausible Achievable Perimeter: In step 400.2, the LOAD 305 selects potential candidate airports 504.3 from among the airports listed in the static databases 315. The LOAD 305 may be configured to select candidate airports 504.3 based on a variety of criteria, as discussed further below in this document (see, inter alia, FIG. 9 and other discussion below). Because the situation is an emergency situation, the LOAD 305 is generally preconfigured with appropriate criteria.

In one exemplary embodiments, one criteria may be that any candidate airports must be within a certain specified, designated radius, such as (for example and without limitation) 20 miles, 50 miles, 75 miles, or 100 miles from a present position of the aircraft 100. In an embodiment, the acceptable radius may vary in part depending on flight and aircraft conditions 504. For example, the acceptable radius may be greater if the aircraft 100 retains at least partial engine or flight power, while a shorter radius may be specified if the aircraft is flying completely unpowered (that is, as a glider). The acceptable radius thereby determines a plausible achievable landing perimeter (PALP) 900 for potential airports for possible attempted landings.

It is noted that the term "plausible achievable landing perimeter" does not designate an area where all emergency landings will be safe. (Or even, where any emergency landings will be safe.) Rather, the term "plausible achievable landing perimeter" designates an area which, according to the present system and method, is deemed realistic and plausible for calculating simulated landing outcomes for airports (or other potential landing sites) within the determined PALP. As noted above, in some embodiments the PALP may be a fixed radius from the aircraft. In alternative embodiments, a PALP may be determined by the present system and method according to current aircraft condition, direction, speed, thrust, operating condition, weather conditions, fuel reserves, and other factors.

Similarly, the allowed radius may vary depending on altitude, current aircraft speed, current aircraft rate of descent, and similar factors. The selection of candidate airports 555 (see FIG. 5) may also be determined by comparing the runway length required for a safe landing by the present aircraft, with the runway lengths also listed in the static databases 315 for the airports within an otherwise acceptable radius. A selection of candidate airports 555 may also be based on other factors, such as recently collected data on airport runway conditions. (In FIG. 5, below, candidate airports 555 are selected from among nearby airports 504.3.)

In step 400.3, the LOAD retrieves from system memory 220, 230 a simplified aircraft flight path model 307. In one embodiment of the present system and method, a single aircraft flight model 307 may be stored and is considered applicable for all possible emergency landings. In an alternative embodiment, the LDA 300 may store two or more alternative flight path models 307. Some models may be more complex, or require greater calculation intensities than others, and a choice of which model to use may be determined in part based on an initial estimates of the amount of time the aircraft may have available to make a landing. (Such an initial estimate may be based, for example on flight altitude, flight rate of descent, and the distance of the nearest and or farthest airports, which may be available for landing.)

In general, a simplified aircraft flight path model 307 is a model, either two-dimensional or three-dimensional, of a flight path which is segmented, where the segments approximately form a curve as necessary to delineate a pass to a particular airport. Except for the case where candidate airport 555 happens to be directly along the current trajectory of the aircraft, a segmented linear path 580 is not a realistic representation of the true flight path, which would be curved. However, a flight path 580 represented as a series of linear segments will generally require less calculation than a continuous curved flight path calculation. For the purposes of determining an optimum airport for an emergency landing, and since the fine details of the landing will be handled in general by a human pilot, a flight path model which identifies various potential flight paths in terms of multiple linear segments, may be sufficient for assessing flight landing probabilities and risks of various candidate airports.

In general, any aircraft flight path model 307 of the present system and method will be a mathematically simplified, relatively lightweight model compared to flight path models that would be employed for detailed simulation during aircraft development or for use in aircraft simulators for pilot training purposes.

In step 400.4, the LOAD 305 creates multiple simulation scenarios for potential landings. Due to the inherent time pressures of an emergency situation and an emergency landing, it is an objective of the present system and method to rapidly calculate multiple landing scenarios 685 within a short span of time, for example within five seconds, ten seconds, or fifteen seconds, though other longer or shorter periods of time may be envisioned.

Of the multiple landing simulation scenarios 685 which are generated in this (exemplary) span of five to fifteen seconds, each simulation scenario may vary from the others in a number of respects. These respects may include, for example and without limitation:

>>the destination candidate airport;
>>a selection of a runway at a particular destination candidate airport;
>>multiple choices for a rate of descent towards a candidate airport;
>>multiple choices for a sustained rate of travel, an initially accelerated rate of travel, or a de-accelerated rate of travel towards a given airport;
>>various choices for the use of flaps and the extension of landing gear during the descent; and
>>other parameters determinative of the usage of the airplanes and available resources for landing purposes.

Inevitably, such choices must take into account any limitations imposed by the current emergency situation for the aircraft. If the engines are no longer powered, for example, then an accelerated rate of descent is not feasible. If only one engine is available, or if one wing is partly damaged, these factors too must be taken into account as an element of each simulation scenario.

Simulation scenarios 685 may further vary with variations in flight path 580 from the present aircraft location to a given destination airport. For example, if a potential destination airport is located substantially aft of the aircraft, then the plane may have the option to either bank left or bank right in attempting to reach that airport; two different simulation scenarios 685 could be generated, one for banking left and one for banking right. However, a choice of the two particular paths may also vary depending on potential obstacles such as buildings or towers which may present themselves when banking to the left vs. banking to the right. Each scenario will also take into account environmental factors such as wind speed, or precipitation.

In keeping with the requirements of rapid simulation, the aircraft flight path model 307 may employ various simplifications. For example, even in gusty environments where wind speed is variable, the simplified simulation model 307 may assume a substantially constant wind speed from a substantially constant direction. Other simplifications may be employed as well. Elements of exemplary simplified aircraft flight models are discussed further below in this document.

Step 400.5 may be performed prior to, subsequent to, or simultaneous with, step 400.4. In step 400.5, one or more delay times are factored into the simulation scenarios. The delay times may include human delay times, such as taking into account that it may require several seconds (or even a time period close to a minute) for a pilot to actually initiate action and choose a landing location. The delay times may also take into account how long it takes for the aircraft systems to respond to various commands, for example, how long it takes the landing gear to be extended. These delay times, which may be predefined parameters, or possibly predefined parameters subject to certain conditions, may be taken into account when creating simulation scenarios.

For example, at the time an emergency situation is first detected, the LOAD 305 may be programmed to assume that it will take at least 30 seconds for the pilot to fully grasp the situation, assess a landing choice, and initiate actions. Therefore, the simulation scenarios may be based on the position of the aircraft as it is anticipated to be for 30 seconds subsequent to the moment to detection.

On the other hand, if the pilot has not initiated actions by the 30 second mark, the system may assume that the pilot is nonetheless rapidly assessing the situation, and so may assume only further delays of five seconds, ten seconds, or fifteen seconds between the time when additional simulations are initiated, and the time when the pilot actually take action.

In a step 400.6, the LOAD 305 evaluates airport reachability/confidence level 392. Airport reachability 392 may be defined as the success rate per target airport 555 as a function of action time delays 394. Stated another way, airport reachability 392 provides an assessment of the probability of making a safe landing at different airports 555, assuming that pilot action were to be initiated either immediately or within a short period of time (for example five seconds, fifteen seconds, or possibly thirty seconds). The calculation of the probability of reaching different airports and making a successful landing is based on various data which is provided as output by all the steps 400.2 through 400.5. Details of such reliability calculations are presented further below in this document.

In FIG. 4, steps 400.1 through 400.5 are presented as successive steps. This is for convenience of illustration only. In embodiments of the present system and method, steps 400.1 through 400.5 may occur simultaneously or in different orders.

In step 400.6, the results of the simulations are presented to the pilots for evaluation and final human determination of a preferred emergency landing site. In step 400.7, the LOAD 305 re-initiates the sequence of steps 400.1 through 400.6, in order to update the potential landing scenarios 685. In an embodiment of the present system and method, this re-initiation occurs at most every 10 seconds, but may vary depending on actual calculation speeds.

Step 400.7 has several potential purposes. (i) In the event that the pilot has not yet reached a decision as to a landing site, or has not yet initiated action towards a particular landing site, the updated simulation scenarios 350 determine if conditions/circumstances have changed such that the probabilities of safe landings at different airports 555 have changed. (ii) Even in the event that the pilot has initiated descent towards a particular airport 555, other landing options may still remain available, at least for short time. Further changes in aircraft conditions or environmental conditions (or both) may indicate that an alternative choice suddenly has a better chance of being a safe landing option. In that case, the pilot may have the option and the opportunity to adjust his or her choice of landing site to increase the chances of a safe landing. (iii) While en-route to a given destination emergency landing site, a pilot may assess, based on any number of factors, that the site is no longer an option. For example, the pilot may be informed by air traffic control that a desired runway is simply not available for landing. In that event, the pilot must choose an alternative landing destination 555, and the continued updates based on continued simulation scenarios provide the pilot with the best possible available options for landing site.

In an embodiment of the present system and method, the method 400 ceases operation intentionally only once it is determined that the plane has achieved a safe landing, or should the simulation be terminated by pilot choice or other events.

Exemplary Simulation Scenarios and Landing Probabilities

Figure 5:
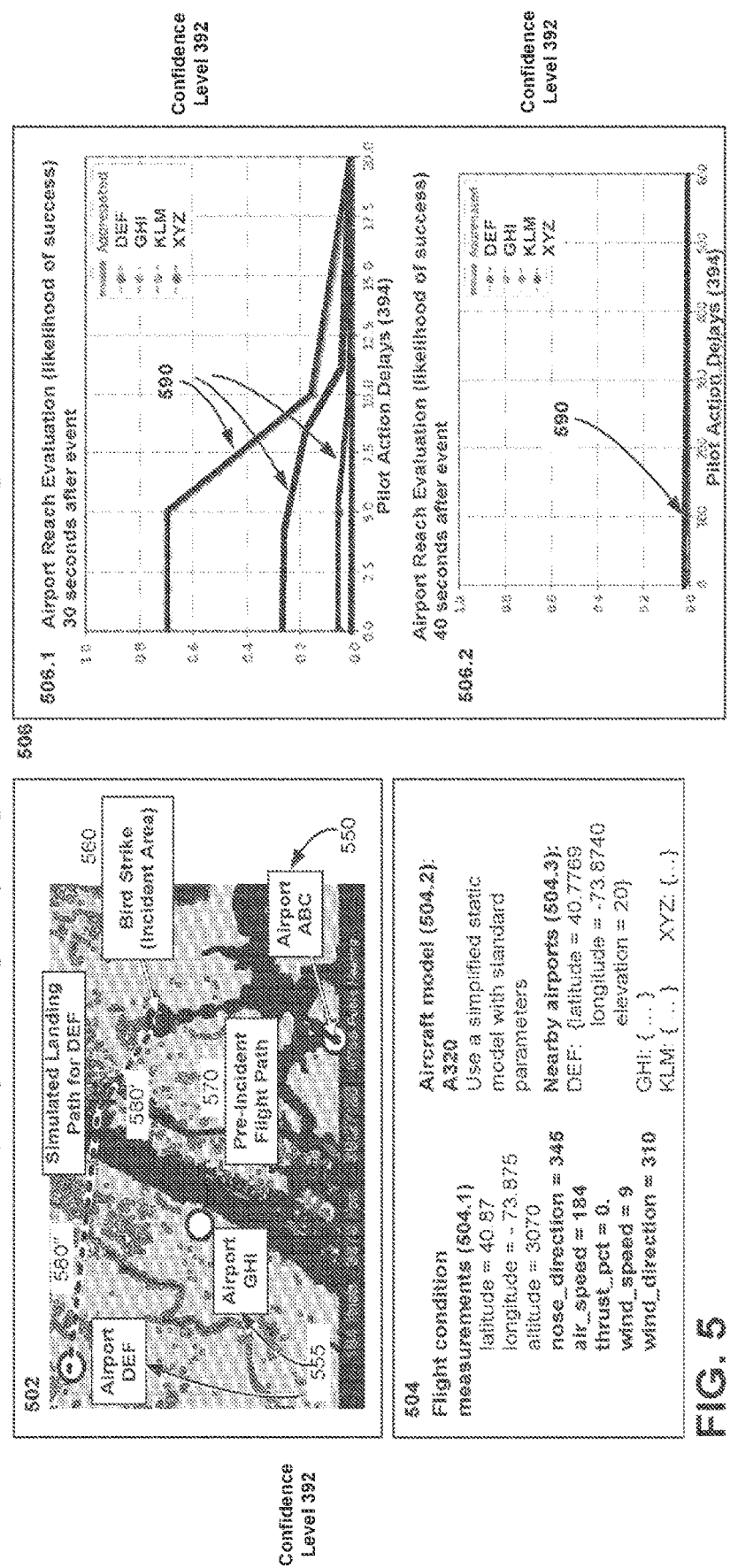
FIG. 5 illustrates exemplary elements of an exemplary emergency landing scenario as may be generated according to the present system and method.

FIG. 5 illustrates some elements of an exemplary emergency landing scenario 685 as may be determined according to the present system and method.

Panel 502 illustrates elements of an exemplary flight situation and an exemplary flight emergency. In the exemplary flight situation illustrated, an aircraft 100 takes off from an origin airport 550 (airport ABC). Shortly after take-off, and en-route to its intended destination, the aircraft 100 experiences an emergency incident at an incident location 560. In this instance, the incident may entail the aircraft 100 being struck by birds which are pulled into the jet engines 160 and render both the jet engines unpowered. (In reality, this scenario did occur and resulted in the aircraft 100 actually "landing" in the nearby river, which was not a desired outcome.)

As illustrated in panel 502 the present system and method may identify several potential nearby airports 504.3 as potential emergency landing sites 555, for example, airports DEF and GHI (and possibly additional airports KLM and XYZ, not illustrated in panel 1). The present system and method may generate either one or more than one simulated flight paths 580 to each of these airports 555 which may be within a preferred radius of landing.

A single simulated flight path 580 for an attempted landing at airport DEF is illustrated in panel 502. In some embodiments of the present system and method, and as shown in the figure, the simulated flight path 580 may entail just two linear segments, when in reality the airplane will be required to take a continuously curved flight path if it is to arrive at airport DEF. However, in some embodiments of the present system and method, and for purposes of the present simulation calculations, a simulated flight path with a limited number of linear segments may be sufficient for the calculations at hand, while reducing computational time. The two flight path segments 580', 580" shown in the figure are exemplary only, and more linear segments (580' . . . 580.n, n>2) may be envisioned. In other embodiments of the present system and method, flight path simulations 580 may employ curved segments. See for example FIG. 11 below and associated discussion.

Panel 504 illustrates some exemplary inputs for generating a simulated flight path 580 for the landing. These may include flight condition measurements 504.1, an aircraft model (504'.2), and the latitude and longitude of nearby airports (504.3). In an embodiment, the nearby airports (504.3) may include the origin airport 550, if the origin airport 550 remains a potential option for an emergency landing (as may be the case if the incident occurs shortly after take-off). Other potential inputs, including those discussed elsewhere in this document in conjunction with various embodiments, and are not included in the figure.

The simulations per se are then used to generate reachability evaluations 392 or probabilities 392 of the aircraft 100 reaching an airport 555 in time to make a safe landing, as per step 400.6 of method 400 already discussed above. As shown in panel 506, a likelihood plot 590 of a successful landing may be calculated with confidence levels 392 being contingent on the time it takes for the for the pilot to initiate landing activities, including making an airport selection and then actually starting to steer the aircraft 100 in the correct direction subsequent to the incident event 560. A set of simulation scenarios 506.1 illustrates the probability plots 590 for several different airports, assuming the pilot initiates activity at the thirty (30) second mark after the event. The consequences of further delays, which generally entail reduced probabilities as are rapidly apparent from the chart updated on a pilot display. Underscoring the urgency of the quick decision, a second set of simulation scenarios 506.2 indicates the probabilities of success (which may be near zero in this exemplary simulation) if the pilot initiates action forty (40) seconds after the event 560.

Simplified Aircraft Flight Path Models

In general, aircraft flight path models are mathematical frameworks (typically, systems of equations and/or parameter constraints for the equations) which may be employed to calculate hypothetical flight paths. Such models are based on equations, well-known in the art, which take into account basic mechanical laws of physics for acceleration, gravity, and linear and rotational dynamics; aerodynamic models of aircraft and aircraft wings and flaps; fluid dynamics of the air; equations to simulate aircraft engine performance; weather/thermodynamic equations; and equations for other environmental and engineering phenomena which have significance for aircraft flight. Modern aircraft flight models are typically implemented, and applied to specific airplanes and flight scenarios, by coding computer programs which can rapidly process all the equations (with their numerous interactions) and dynamic input data.

The simplified aircraft flight-path models (SFAPM) 307 employed by the present system and method (discussed above in conjunction with exemplary method steps 400.3 and 400.4) may vary in different exemplary embodiments. In some embodiments of the system and method, a simplified flight path aircraft model (SFAPM) 307 searches for and/or generates a fastest path from any aircraft location to a destination airport 555, typically with constraints due to reduced aircraft thrust. For any particular craft 100 in distress, and for any selected destination airport 555, the SFAPM 307 may or may not find a solution for the aircraft 100 to reach the airport for a survivable landing before its touches the ground in the form of a crash (typically, though not necessarily, colliding with the ground short of the airport or the airport runway).

In general—and as compared with flight path models which may be employed in the design of aircraft or flight path models for use in pilot simulators—an exemplary simplified flight path model 307 of the present system and method would entail those simplifications in calculation which are necessary to: (i) generate a substantial number of alternative flight path models to each of (ii) multiple different potential target airports, (iii) all calculated within a small portion of the limited time available in emergency conditions, and (iv) only using the processing power available for on-board, real-time processing according to the processing power available to processors 315 which are customary for use in aircraft (or reasonably anticipated for aircraft use) at the time this document is filed.

In an embodiment of the present system and method, the SAFPM 307 may be configured to calculate at least ten flight paths each, to each of at least two alternative destination airports, using only the processing resources of a single multi-core processor limited to two cores. In an embodiment of the present system and method, the simplified flight path module 307 may be configured to calculate at least twenty flight paths each, to each of at least three alternative destination airports, using only the processing resources of a single multi-core processor limited to two cores. In various embodiments, the allowed time span limitation for calculations of the flight paths may be limited to, for example and without limitation, five seconds, ten seconds, twenty seconds, thirty seconds, forty-five seconds, or one minute.

In some embodiments of the present system and method, simplified flight path models 307 incorporate an assumption that the aircraft cannot maintain a steady altitude (due to, for example and without limitation: thrust loss, electrical system damage or other power loss, partial loss of aircraft structural integrity (for example, wing damage or a hole in the fuselage)), so that the aircraft 100 must forcefully descend with a substantially predictable rate of descent.

In various embodiments, a simplified aircraft flight path model 307 includes variables or parameters, and suitable equations, to predict a slight path and flight vectors based on such factors as: (i) Aircraft geo-coordinates, altitude, and nose orientation; (ii) Aircraft weight; (iii) Aircraft thrust, including both current thrust and expected available thrust; (iv) Aircraft drag coefficient; (v) Aircraft airspeed, both at the time an emergency is detected and as the craft is expected to accelerate due to gravity and continued application of available thrust (if any); (vi) Aircraft rate of descent (or rate of climb, if any power is available at all); (vii) Aircraft bank angle (during turning), which may be limited due to aircraft impairment; (viii) Airport geo-coordinate, elevation, and runway orientation (which will vary for different nearby airports and different runways); (ix) Wind speed and wind direction; and (x) Precipitation conditions, visibility conditions, and temperature.

In various embodiments of the present system and method, and for the sake of rapid, efficient computation, a simplified aircraft flight model 307 will deliberately exclude some factors which would normally be taken into account in more complete simulations (as may be desired for example for aircraft simulators for pilot training). For just one example, which is not limiting, changes in aircraft weight over time, due to fuel usage, which may usually be considered for a detailed flight simulation, may be excluded due to the very short time span of the present simulations. (However, the simplified flight model may be designed to factor-in changes in aircraft weight if, for example, the emergency situation is due to a rapid fuel leak; or if the craft is a military or cargo craft, where some payload may be rapidly "dumped" in some circumstances.) Similarly, some equations of physics or equations modelling aircraft performance may be simplified for present purposes (for example, some $2^{nd}$-order terms may be omitted for some purposes), which still providing for sufficient accuracy.

Regarding wind speed, wind direction, precipitation, visibility, and temperature, in some embodiments of the present system and method, any or all of these environmental factors may be assumed to be substantially constant over the available flight paths and available time for landing. Such an assumption may substantially simplify calculations and so reduce the time required to generate the necessary simulations.

In alternative embodiments, some limited adjustments may be made to take into account potential variations in the environment over the flight path. For example, for a given selected destination 555 (a particular airport and particular runway), two or even three simulations may be run with different wind speeds (for example, a first simulation which assumes a constant wind speed which is the same as the detected wind speed at the moment of the flight incident; and then a second simulation and a third simulation, each employing a different fixed wind speed which may be higher or lower than the current wind speed, or possibly employing a wind speed which increases or decreases linearly). A final estimate for chances of a safe landing along the flight path may be based on a weighted average from the three scenarios.

Similar variations may be envisioned taking into account different wind directions, increases in precipitation over a short time (for example, in a storm environment), or changes in temperature (which could for example increase short-term icing if the aircraft is flying through freezing rains).

Exemplary Method to Generate Emergency Landing Flight Simulation Scenarios

Figure 6A:
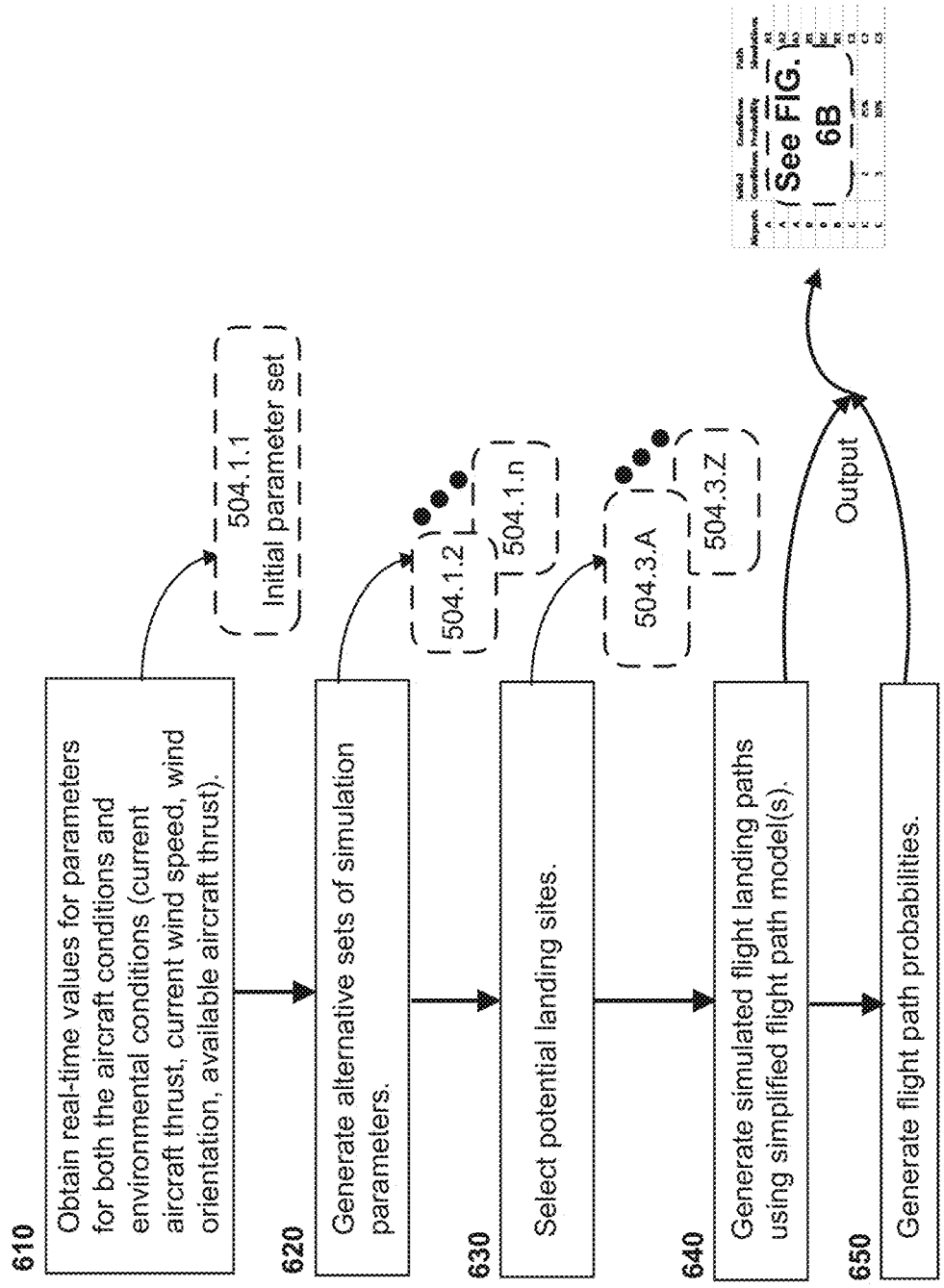
FIGS. 6A and 6B present a flow-chart of an exemplary method for generating flight path simulations for emergency landings according to the present system and method.
Figure 6B:
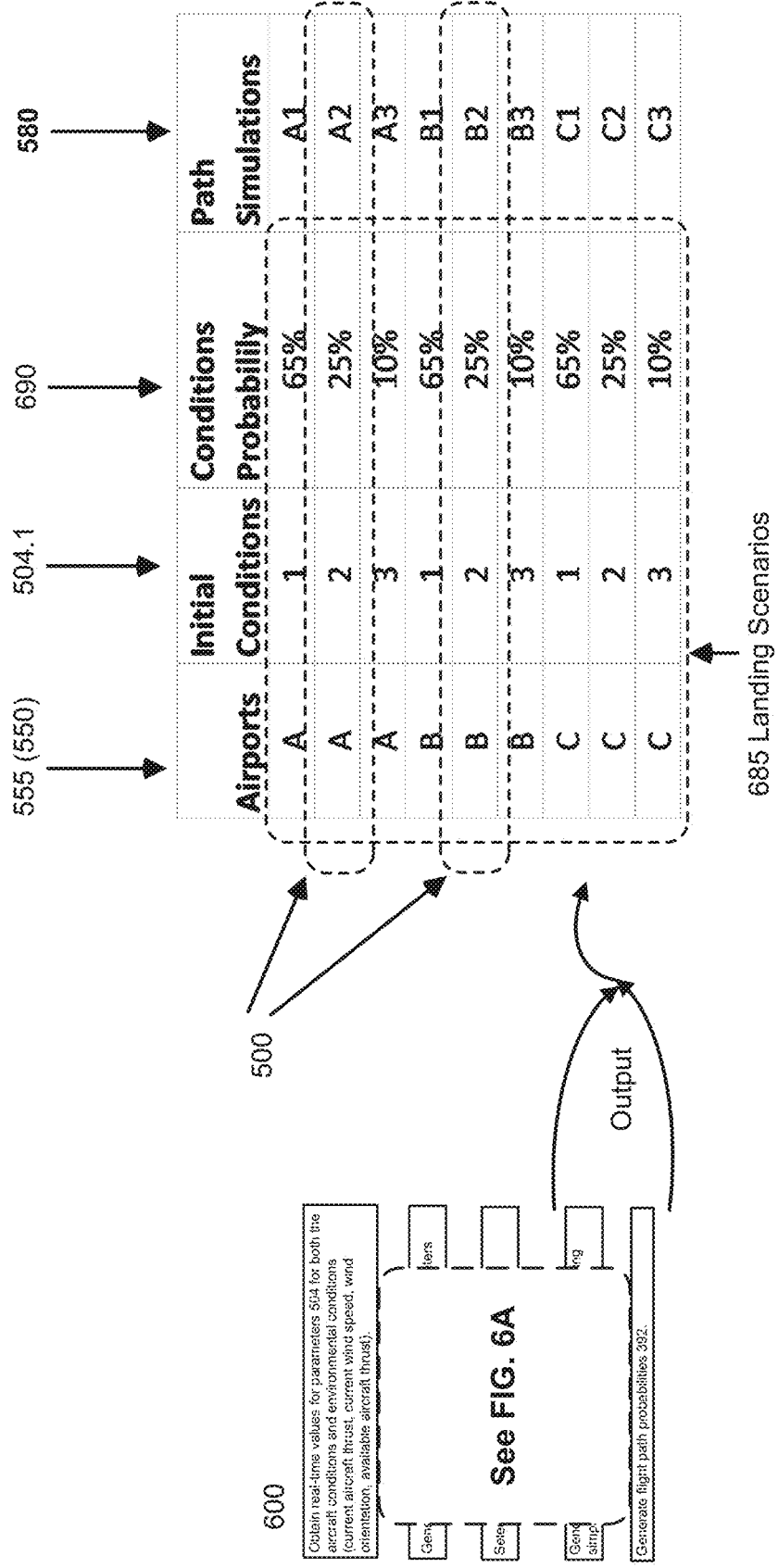

FIG. 6 is a flow-chart of an exemplary method 600 for generating flight path simulations 580 according to the present system and method. Here, method step 400.4 of method 400 has been relabeled as its own method 600, with multiple steps. The method 600 may be performed, in part or in whole, by the landing options assessment module 305 of the LDA 300.

The method begins with step 610. In step 610, the method obtains appropriate real-time values for parameters 504 regarding both the aircraft conditions and environmental conditions, such as for example and without limitation: latitude, longitude, altitude, current aircraft thrust, current wind speed, wind orientations, available aircraft thrust, temperature, visibility, and other related flight/environmental parameters 504. This yields an initial set of simulation parameters 504.1.1.

Step 620 is optional but beneficial. In step 620, the method generates at least one, and typically two or more alternative values for each parameter 504, in addition to the real-time value(s) obtain in step 610. For example, the method may generate two or more alternative values for the aircraft thrust, two or more values additional values for wind speed, and so forth. This makes each parameter (thrust, wind speed, wind direction, etc.) a multivariate parameter, with one value based on the current, measured, real-time value (as measured by sensors 346), and the additional values may be determined from a designated distribution (for example, Gaussian, or exponential) or according to certain empirical distribution indicative of historical events (for example, known wind-speed distributions). The result is multiple sets of starting parameters 504.1.2, . . . , 504.1.n.

The alternative values serve as the basis for calculating different landing scenarios 685 and low altitude diversion recommendations 350 based on potential or plausible changes in environmental/aircraft conditions during the time available for the attempted landing. In an embodiment, and for each set of flight/environmental parameter 504.1.n, step 620 may also generate a probability of occurrence for each generated sample value.

It will be apparent to persons skilled in the relevant arts that the ranges for alternative values may be limited by current aircraft operating conditions. For example, in an aircraft with at least partial thrust capabilities, it may be possible to increase thrust and/or altitude. However, if it is determined that the engines 160 of the aircraft 100 are completely disabled, then no increase in thrust is possible, and any increase in altitude (for example, using wing flap adjustments or due to increased headwinds) may be very limited or impossible.

In step 630, the method 600 selects a potential landing site 504, such as a potential nearby airports 504.2. This is discussed further below.

In step 640, the method generates a specific simulated flight path 580.n for each sample for each destination airport 504.3, which together with its probability/confidence level 392 forms a simulation scenario 500.n. Each simulated flight path 580.n is calculated in accordance with the equations of the simplified aircraft flight path model (SAFPM) 307, taking into account a particular airport 504.3, a set of flight conditions 504.1, and the aircraft model 504.2.

In step 650, the method generates a probability that a particular landing path scenario may be applicable for each simulated flight path 580.n. The probability for each flight path may be calculated based in part on a weighting of the likelihood of different flight conditions 504.1 as determined in method step 620.

Method 600 for generating landing scenarios 685 is exemplary only, and should not be construed as limiting. Additional method steps or alternative method steps may be employed as well.

Exemplary Methods to Identify Airport Reachability

In some embodiments of the present system and method, it is an to not only identify potential destination airports 555 (which may sometimes include the origin airport 550); but further to further rapidly assess a probability of a safe, crash-free landing at each possible destination airport 555.

Figure 7A:
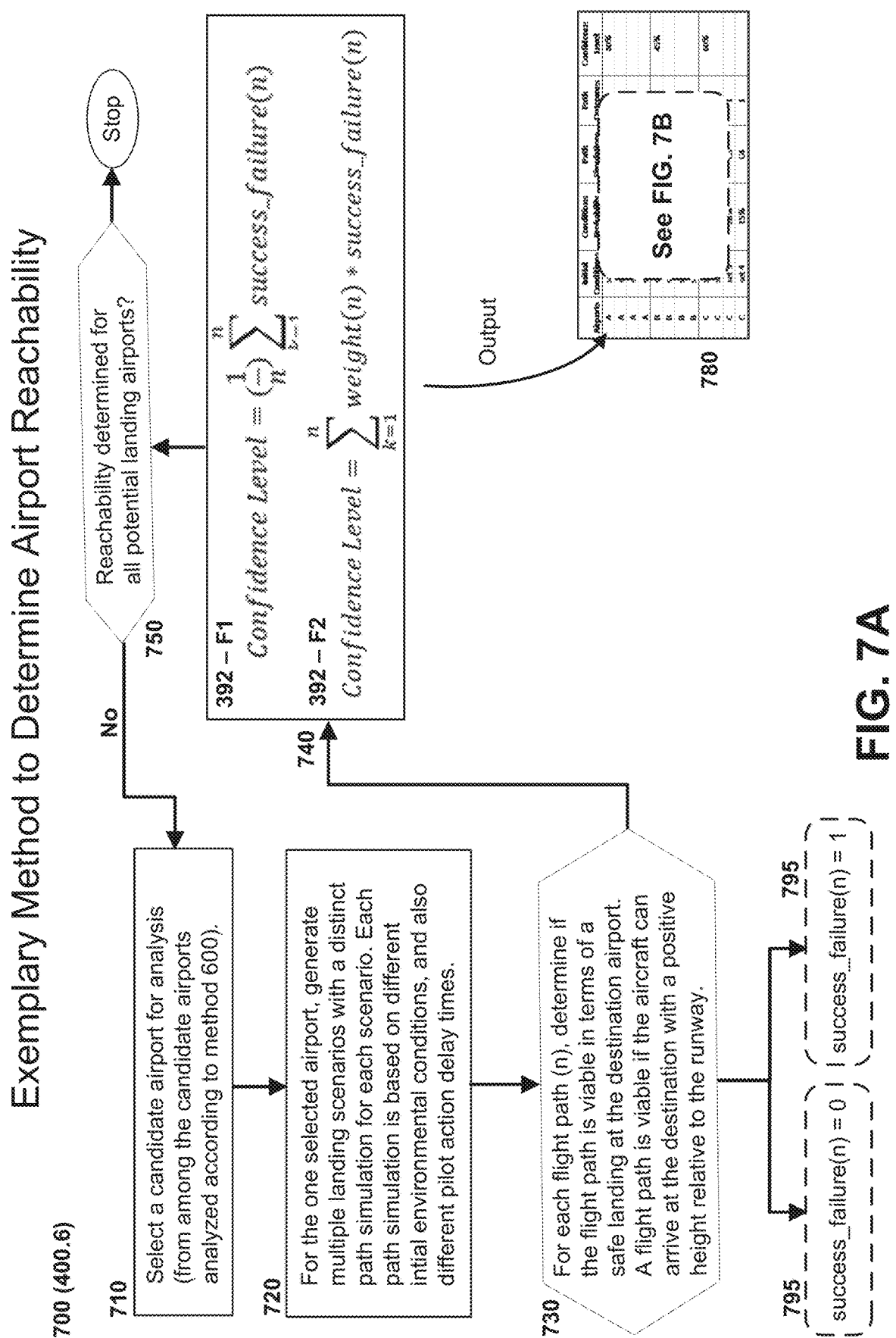
FIGS. 7A and 7B present a flow chart of an exemplary method for assessing a confidence level for airport reachability according to the present system and method.
Figure 7B:
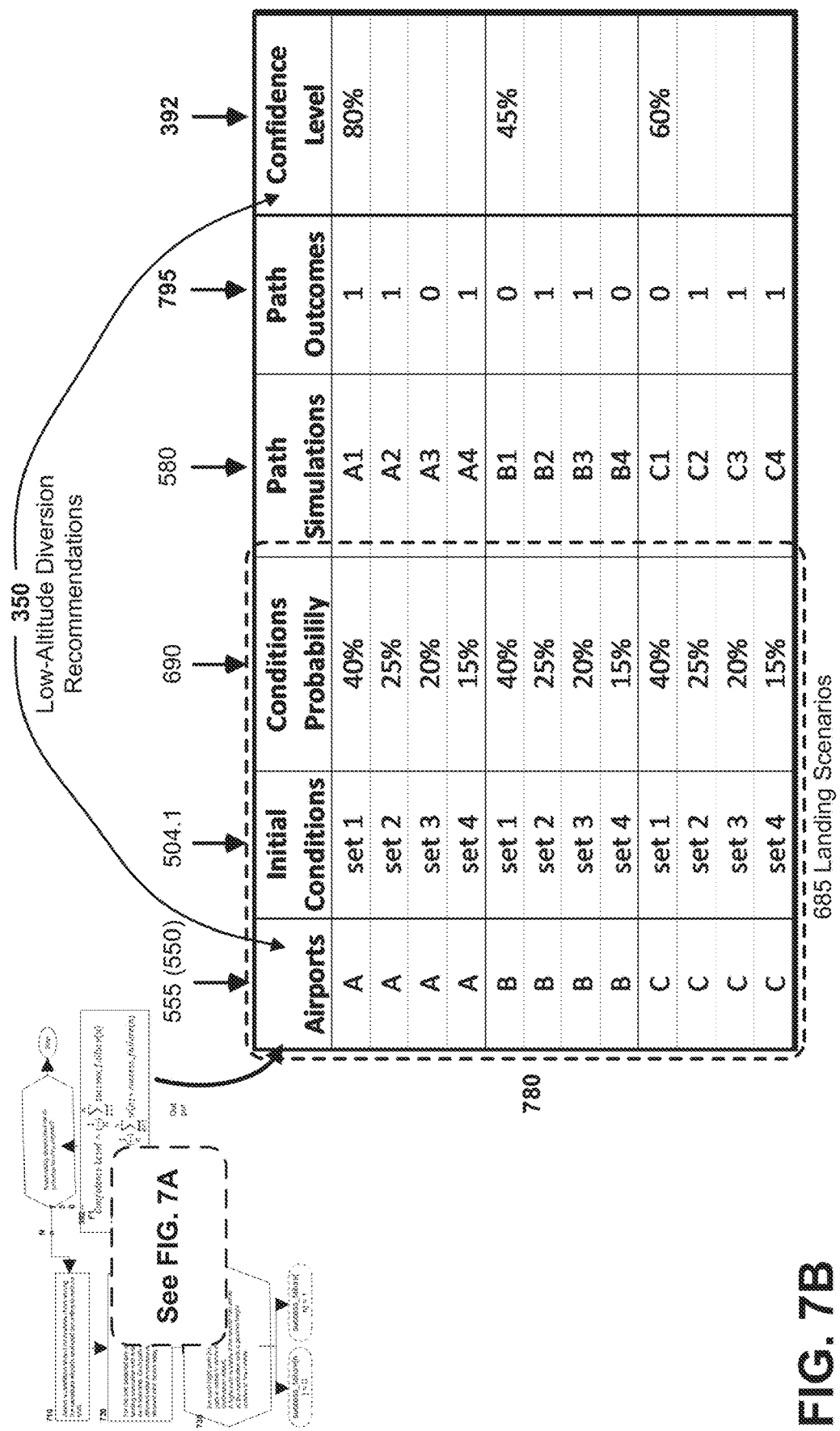

FIG. 7 presents a flow chart of an exemplary method 700 for assessing a confidence level 392 (also referred to as an "airport reachability" 392 or "probability of reaching an airport" 392) for a safe landing according to the present system and method. Here, method step 400.6 of method 400 has been relabeled as its own exemplary method 700, with multiple steps.

Exemplary method 700 may construed as extending or continuing exemplary method 600 described above (see FIG. 6), which generates landing scenarios 685 and in particular for simulating flight paths 580. In exemplary method 600 above, separate scenarios are generated for each destination airport 555, and for a range of different aircraft conditions 504.1.

In an embodiment, exemplary method 700 may generate additional scenarios 500 and flight paths 580, in a manner similar to method 600, but further taking into account additional differentiating factors which may include, for example and without limitation: two or more different landing runways at potential landing airports 555, and different action delay times (in seconds or minutes) before pilot action is actually initiated.

Exemplary method 700 begins with method step 710. In step 710 a candidate airport 504.3 is selected for analysis (from among the candidate airports analyzed according to method 600).

The method continues with step 720. In step 720, multiple landing scenarios 685 are generated, with a distinct path simulation 580.n for each scenario. Each path simulation 580 is determined in a manner similar to that of method 600 above, with each path simulation taking into account initial conditions 504.1, and also different pilot action delay times 394.

It will be noted that an action delay time 394 is the amount of time before the pilot actually chooses a destination and initiates flight actions (such as changing the direction of the aircraft 100) towards the destination airport 555. Path simulations may be determined or calculated for each potential action delay time in a pre-defined list of delay times, which may include (for example and without limitation) 5 seconds, 10 seconds, 15 seconds, 20 seconds, 30 seconds, and 45 seconds. Other possible delay times may be identified as well.

The method continues with step 730. In step 730, and for each flight path 580.$n$ generated in step 720, the method determines if the flight path is actually viable in terms of a safe landing at the destination airport. A flight path 580.$n$ is feasible or viable if the aircraft can arrive at the destination airport (and destination runway) with a positive height remaining relative to the airport elevation. (If the simulated flight path 580.$n$ shows a negative height for the aircraft, this means the aircraft 100 would crash into the ground if it pursued the flight path 580.$n$ under evaluation.)

In brief, then, the method 700 simulates a multiplicity of possible flight paths 580.$n$ to the destination airport 555, with each of the flight paths being simulated within the bounds of a plausible set of possible flight conditions for the remaining time. Each flight 580.$n$ is tagged is "viable" or "not viable", or by some other binary (1/0) designation, according to whether or not the flight path 580.$n$ would result in a safe landing or a crash. The results is that, for the candidate airport selected in step 710, multiple possible flight scenarios have now been generated, and each scenario has been evaluated with a path outcome 795 (represented in the exemplary formulas F1, F2 immediately below by the variable success_failure(n)).

The method continues with step 740. In step 740, all the flight path scenarios 580 for a given airport 555 are averaged, possibly with the average weighted by the condition probability 690 for each flight path simulation 580, according to either of the exemplary (and non-limiting) formulas:

$$\text{Confidence Level} = \left(\frac{1}{n}\right)\sum_{k=1}^{n} \text{success\_failure}(n) \tag{F1}$$

$$\text{Confidence Level} = \sum_{k=1}^{n} \text{weight}(n) * \text{success\_failure}(n) \tag{F2}$$

In one embodiment of the present system and method, the value of success_failure(n) 795 is either 0 or 1. That is, the confidence level 795 for success of landing at any given airport is determined according to an average (possibly a weighted average) of the number of flight path scenarios which result in a successful landing.

FIG. 7 includes an exemplary table 780 with exemplary results of such a calculation.

Persons skilled in the relevant arts will appreciate that the method 700 is exemplary only, and other similar or more extended calculations may be envisioned within the scope and spirit of the appended claims. For example, in some embodiments of the present system and method, the chance of success or failure (safe landing or crash landing) may sometimes be evaluated not in strictly binary (1/0) terms, but rather with gradations between 0 and 1. In that case, formulas F1 and F2 still apply, but success_failure(n) may be 0; 1; or some intermediate value with where 0<p<1. In some embodiments, p may assume only a limited set of discrete values (for one example, and without limitation, 0, 0.25, 0.5, 0.75, 1), which may reduce computational complexity. In alternative embodiments of the present system and method, p may assume a continuous range of values.

For one example, in some embodiments the flight path simulations may include an estimate of landing speed, and the landings which must be made at greater than some safe threshold speed may be assigned a success/failure change of 0.5, or some other value. For another example, in some embodiments the flight path simulations may include an estimate of whether or not airplane landing gear (such as the wheels, breaks, or wing flaps) will be successful in slowing the plane down sufficiently upon landing, and here again success/failure chance may be assigned some value between 0 and 1. For yet another example, in some embodiments the present system and method may include, in a landing scenario 685 and flight path simulation 580, an estimate of whether a fire may break out on board the aircraft, or whether an existing small fire is likely to grow in the time span of the landing.

After step 740, the method continues with step 750. In step 750, the method determines if potential flight paths 580 have been simulated for all potential landing airports 555 (550). If "yes", the method stops. If "no", the method continues for another potential landing airport 555.

Action delay times: As per discussion above, an "action delay time" 394 is the time (typically in seconds) between when landing options are presented to a pilot, and when the pilot actually selects an option and initiates actions to take the plane 100 to the selection destination. In one embodiment of the present system and method, all the flight path scenarios 580 for a given airport 555 are averaged, one scenario 580.$n$ for each set of condition probabilities among multiple sets; and further for each such set, one simulation for each action delay time of a range of possible delay times. In an alternative embodiment, optional early stopping of some calculations may be employed. If the success rate for a given action delay time is already very low, the method may stop making calculations stop further calculations for longer action delay times.

For one example, which is not limiting: Airport ABC may, according to simulations, be a viable landing option for action delays of 5 seconds, 10 seconds, and 20 seconds; however, for an action delay time of 30 seconds, it may be that the calculated chances of a successful landing fall below a designated percentage (for example, below 30%). In that case, and in some embodiments, the method may not pursue calculations for action delay times of 40 seconds or longer.)

Airport Reach Models and Changing/Variable Environmental Conditions

In some embodiments of the present system and method, landing simulations may take into account environmental conditions 504.1 and/or aircraft conditions 504.1 which may be subject to change in the course of an emergency landing. In the course of calculations made by exemplary method 600 for generating landing scenarios and exemplary method 700 to determine airport reachability, the Landing Options Assessments Module (LOAM) 305 may employ airport reach calculations to assess a variety of different confidence levels 392, where each confidence level may be contingent on the potentially changing conditions during the emergency landing.

FIG. 8 presents an exemplary method 800 for taking into account flight conditions or aircraft conditions which may vary in time over the course of an emergency landing.

The method 800 begins with step 810. In step 810, the LOAM 305 obtains the aircraft's current flight condition measurements 504.1, which may include for example and without limitation: latitude, longitude, altitude, orientation, air speed, thrust, climb rate, etc., and other factors discussed elsewhere in this document, and other constraints due to the emergency event.

The method 800 continues with step 820. In step 820, the LOAM 305 obtains the aircraft's current exterior flight environment 504.1, which may include for example and without limitation: wind speed, wind direction, precipitation, and temperature.

The method 800 continues with step 830. In step 830, the LOAM 305 generates one or more sets of alternative flight conditions 504.1. These alternative flight conditions 504.1 may include, for example and without limitation: further thrust loss, further loss of aircraft structural integrity, further electrical power loss; and also variations in the external environment which may include, for example and without limitation: wind gusts, wind direction changes, or increases or decreases in precipitation.

The method 800 continues with step 840. In step 840, the LOAM 305 generates one or more sets of landing scenarios 685, with different landing scenarios for each set of alternative flight conditions 504.1.

The method 800 continues with step 850. In step 850, the LOAM 305 generates for each landing scenario: (i) one or more flight path simulations 580 and (ii) a path outcome 795.

The method 800 continues with step 860. In step 860, the LOAM 305 uses the multiple flight path outcomes for any one airport to generate, for that airport, a confidence level 392.

The simulation results 580, 795, 392 may be obtained according to exemplary methods 390, 400, 600, and 700 as discussed above, or according to other methods within the scope of the appended claims.

The method 800 continues with step 860. In step 860, LOAM 305 calculates a confidence level 392 for a safe landing at each airport.

Exemplary Method to Generate Emergency Landing Flight Simulation Scenarios and Determine Reachability Persons skilled in the relevant arts will appreciate that the methods, and the method steps, indicated above in conjunction with FIGS. 3, 4, 6, 7, and 8 (methods 390, 400, 600, 700, 800) are exemplary only and not limited. Method steps from the different exemplary methods 390, 400, 600, 700, 800 may be combined in different orders, and additional or alternative steps may be employed, consistent with the present system and method and with the scope of the appended claims.

In some embodiments of the present system and method, an exemplary method "M" to generate emergency landing flight simulations and to further determine a likelihood of reachability, may entail the following method steps or procedures:

(M1) Iterate through each candidate airports for emergency landing:

(M2) For each potential target airport, generate a number of scenarios 685 that consist of a combination of various parameters regarding aircraft conditions 504.1 and environmental conditions 504.1, and decision time 394 to actions. The parameters are either set to the real measurement of current environmental conditions 504, or with a variation from the real measurements. The scenarios 685 are assigned with a relative likelihood based on the parameters chosen.

(M3) Determine a current location at the time that simulation/modelling begins. The current location may be either the incident area 560, or an updated location subsequent to the flight incident (if the simulation method is repeated and updated two or more times).

(M4) Use a flight path simulation model 307 to evaluate whether the aircraft 100, from current location, will have a viable flight path to land at the airport 504.3 under each of the generated scenarios. The scenario is called a "success" if a viable flight path is available.

(M5) Fit a curve 396 of "success" rate as a function 396 of time-to-actions 394, weighted by the scenario likelihood.

(M6) Evaluate the curves of success rate of all evaluated airports and decide a critical time to action.

(M7) Rank the airports by the average success rate within the critical time to action; also report the average success rate beyond it as secondary information.

Airport Reach Model and Time-to-Action

As discussed above in this document, various embodiments of the present system and method may entail determining a plausible achievable landing perimeter (PALP) 900, and further to determining a maximum time-to-action 394 (also referred to herein as a time-to-decision 394). The time to decision 394 is construed as the maximum time that may elapse (typically in seconds or minutes) between when a landing option is presented to the pilot, and the time when the pilot must initiate landing action in order to preserve an indicated confidence level 392 for safe landing at the target airport 555.

Some elements of an airport reach model have already been described above, with such a model determining a plausible achievable landing perimeter 900 and suitable nearby airports 555 within the perimeter for simulated flight paths 580.

The plausible achievable landing perimeter 900 may depend only on radial distance from a current position of the aircraft 100, or on radius and on factors additional to distance from the aircraft. For example, a PALP 900 may be based on a fixed radius value r; but the defined perimeter, in relation to the aircraft 100, may be extended forward in distance to take into account both the current direction and current flight speed of the aircraft. Similarly, a PALP may be based on a fixed radius value r; but the defined perimeter, in relation to the aircraft 100, may be shortened aft of the aircraft to take into account all of: (i) the current forward direction of the aircraft; (ii) the current flight speed of the aircraft; and (iii) that reaching airports aft of the aircraft may involve directional changes which may be hampered due to the emergency conditions.

Figure 9:
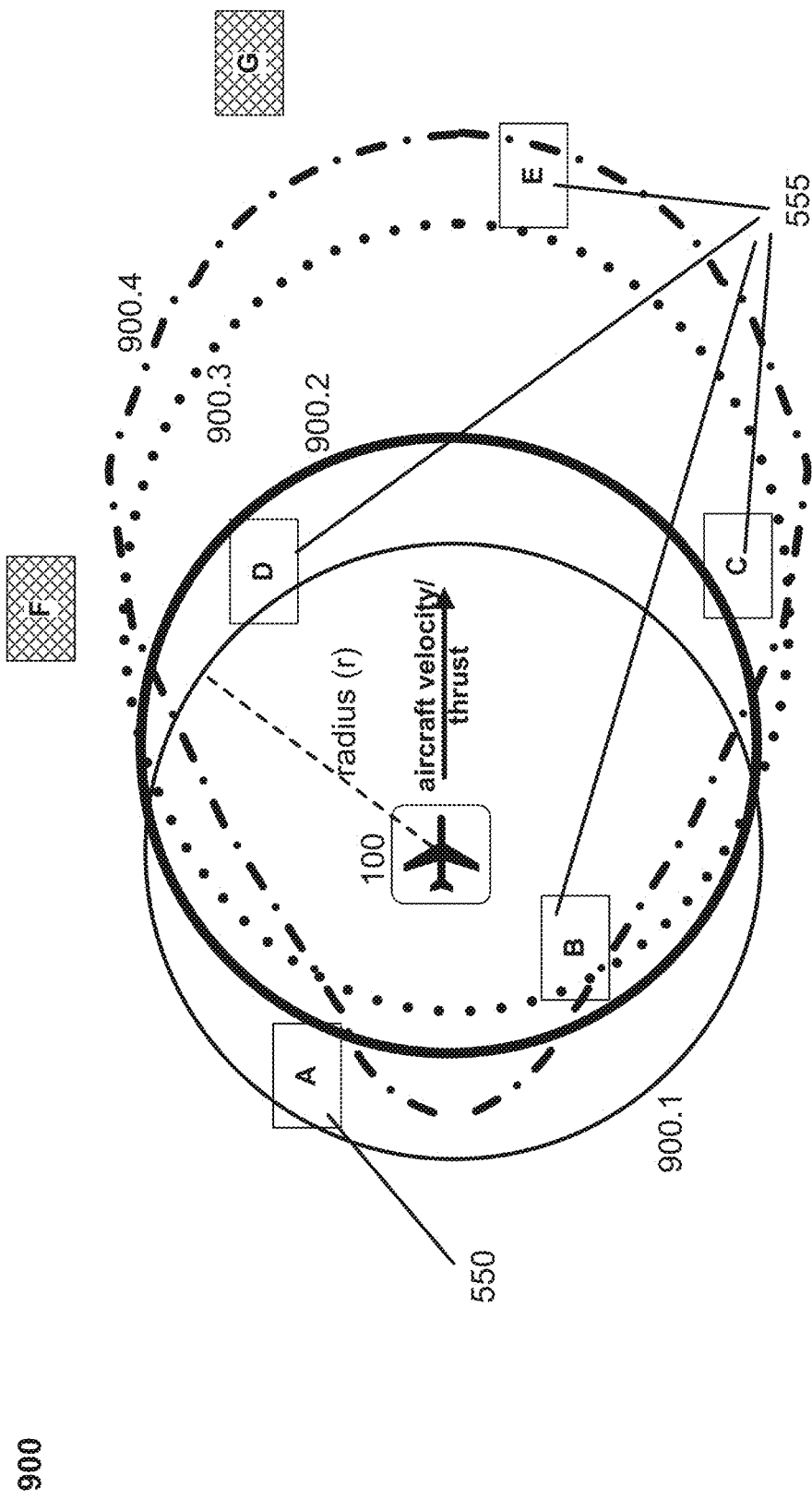
FIG. 9 illustrates some exemplary plausible achievable landing perimeters for an aircraft in an emergency situation.

FIG. 9 illustrates four different exemplary PALPs 900, with various potential airports 555 (550), A, B, C, D, and E, which all fall within at least some of those perimeters. At least two exemplary airports F and G, which may be listed in the database of nearby airports 504.3, are to be excluded from any consideration for emergency landing simulation because they fall outside of any of the PALP's 900. If exemplary perimeter 900.1 is used as the basis for simulations, then only airports A and B would be considered for landing simulations. Similarly, if exemplary perimeter 900.3 is used as the basis for simulations, then only airports B, D, and C would be considered for landing simulation purposes. Calculation of a perimeter 900 may be based in part on a choice of algorithms for the present system and method, and also on available processing time and power for calculating progressively more refined PALPs.

If it is determined that there are no airports 555 within an acceptable radians, the LOAD 305 may make a determination if there are any other suitable destinations, such as extended open fields/desert areas, or substantially linear stretches of highway. The latter determinations, in turn, may also be based on other factors such as, for example, time of day. (A stretch of highway which is expected to be filled with cars during most hours of the day may be recorded in a database as potentially having little or no auto traffic during evening or early morning hours, and so may be an acceptable candidate for consideration for landing.)

In one embodiment of the present system and method, a maximum time to action 394 may be estimated by including, in the simulation scenarios 685, various potential delay times for pilot action. For example, the present system and method may perform a method 600 for generating landing scenarios 685, with different path simulations 580 based on different delay times. The different delay times may be two, or three, or more delay times selected from among exemplary and non-limiting options of: one second, two seconds, three seconds, five seconds, seven seconds, ten seconds, fifteen seconds, twenty seconds, thirty seconds, and forty-five seconds. For each different delay time, a different confidence level for an airport may then be determined according to exemplary method 700 or other methods within the scope of the appended claims.

Addressing Computational Challenges

As noted above in this document, the present system and method is time-critical. When an aircraft 100 is in a risk or emergency situation, a pilot may have only limited time to determine safe landing options. Therefore, the time to calculate and present such options via digital processing is severely constrained. The system and method may also be limited by the available processing power of compact, on-board aircraft computers.

Stated in general terms, if on-aircraft computers 130 were to employ OEM high-fidelity flight-path simulation software (or to employ custom flight-path simulation software using high-fidelity resolution calculations), the on-board computers 130 may not be fast enough to evaluate many potential landing scenarios 685 (each of which may requiring multiple path simulations 580) for multiple potential landing sites 555—all in a short period of time (in seconds).

The present system and method addresses this problem with a number of potential solutions. Various embodiments of the present system and method may employ one, several, or all of the following exemplary, non-limiting avenues to achieve efficient calculations:

(i) The present system and method may employ an analytical surrogate model 307 (a simplified flight path model 307) of the high-fidelity flight path planning models used for aircraft design and/or for aircraft flight simulators for pilot training, to enable fast on-board computation. A surrogate model 307 may need only to evaluate feasibility to reach an airport, according to an approximate flight path simulation, instead of producing a detailed path.

(ii) The present system and method may employ a simplified physics-based flight-path planning model for fast calculation. A simplified physics model may eliminate from calculation, or provide simplified models, for such exemplary, non-limiting flight factors as aircraft drag due to the air, changes in lift due to variations in atmospheric pressure (since the simulated landings are anticipated to be made a low altitudes), changes in effective engine thrust (assuming the engines are providing any thrust at all) due to altitude changes, and changes in aircraft weight due to fuel consumption. In some embodiments, the present system and method may employ simplified physics equations in a cases where linear equations are deemed sufficient to approximate (for short distances, or short time intervals, or both) physics equations which are actually non-linear. Other simplifications may be employed as well.

(iii) In some embodiments of the present system and method, some emergency landing scenarios may be pre-computer prior to take-off. This is discussed further below.

Pre-Emergency (On-Ground or In-Flight) Pre-Computing

In particular, for both the origin airport 550 and for the intended destination airport, the present system and method may anticipate potential (that is, hypothetical but plausible) emergency scenarios that may happen during the low-altitude take-off and landing phases. Landing scenarios and simulated landing paths may be pre-calculated for discrete locations along the original flight path.

In the event of a real emergency that may transpire during flight, the present system and method may simply pick closest simulated flight location/condition that is stored from the precomputed table, and present that to the pilot as a solution.

In an alternative embodiments, the present system and method may pick, from the pre-computer table of emergency landing solutions, several flight paths which: (i) are for nearby locations and similar flight conditions, and (ii) indicated a high probability of safe landings. The present system and method may then still engaged in real-emergency time simulations of flight path solutions, but limiting the options (for example, limiting choices of nearby airports) to only those options which led to the best airport reachabilities 392 in the pre-computing simulations.

In yet another embodiment, the present system and method may employ, during an actual flight emergency, weighted averages of applicable, pre-computed flight simulations to quickly arrive at reasonable estimates of airport reachability 392.

In an embodiment of the present system and method, some pre-computing may be performed, prior to any emergency, by the aircraft computers/controller 130, either while the aircraft is still on the ground (on the runway, for example, waiting to take off); or while the aircraft is en-route to its destination airport (to anticipate and plan for potential emergencies during the landing).

Figure 10:
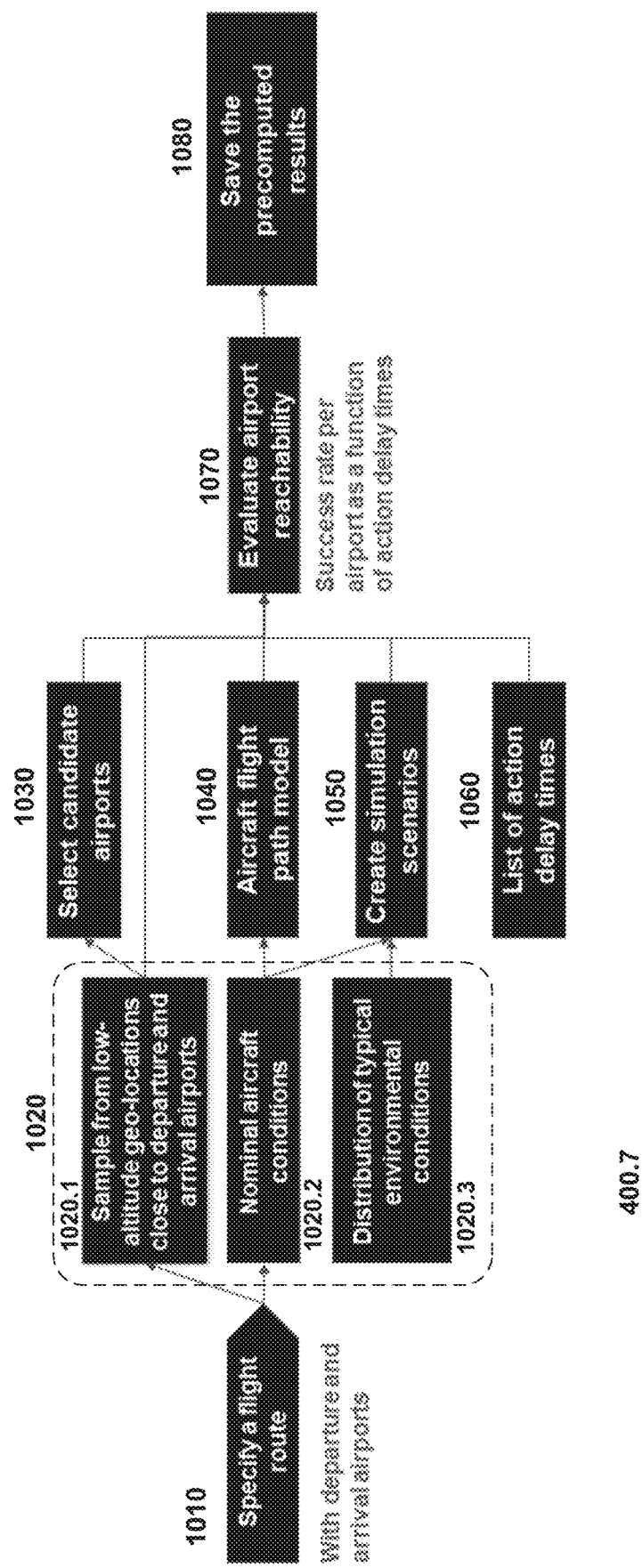
FIG. 10 presents a flow chart of an exemplary method for pre-computing simulated flight landing paths and landing success probabilities.

FIG. 10 presents a flow chart of an exemplary method 1000 for pre-computing simulated flight landing paths and landing success probabilities. The method 1000 may be performed by a computational system with processing abilities the same as, or similar to, those of exemplary aircraft controller 130; or possibly by a ground-based computational system with substantially greater processing power and memory.

The method begins with step 1010. In step 1010, the method receives a specific, intended flight route with a specified departure airport and a specified arrival airport.

In step 1020, the method determines a variety of simulation parameters. These may include, for example and without limitation:

1020.1—Identify a variety of aircraft which fall within a first plausible achievable landing perimeter 900.1 of the departure airport and within a second PALP 900.2 of the arrival airport, and so are potential emergency landing sites 555.

1020.2—For each of the potential emergency landing sites 555, the method obtains sample environmental data from currently available, real-time weather databases (which may include (i) currently expected environmental conditions for the departure airport at the expected time of departure and (ii) currently expected environmental conditions for the destination airport at the expected time of arrival).

Step 1020.2 may also identify a number of potential crisis situations, and associate certain nominal aircraft conditions with each potential crisis situation. Such situations may include loss of power, loss of engine(s), encounters with birds or other obstacles in the air, freezing of the aircraft wings, onboard fires, and other known types of flight crises.

1020.3 —Identify and store various mathematical distributions of typical environmental conditions, so that such distributions may be used as part of the simulations.

Not shown in the flowchart of FIG. 10, the system and method may further identify a variety of simulation points along departure paths or approach paths, respectively, for the departure and arrival airport, so as to employ these specified points as a basis for simulating potential landings from those points.

In one embodiment, which is strictly exemplary and not limiting, step 1020 may identify points along the planned flight paths which are one (1) mile from the intended take-off/landing locations, two (2) miles from the intended take-off landing locations, three (3) miles from the intended take-off/landing location, and five (5), seven (7), ten (10), fifteen (15), twenty (20), and thirty (30) miles from the point of flight origin or from the intended landing location. These locations would be the hypothetical incident areas 560 used as a basis for simulating emergency landings for flight emergencies occurring at these locations. Other distances from may be envisioned as well.

Steps 1030, 1040, 1050, and 1060 perform simulation calculations in a manner substantially similar to that which may be performed on-board the aircraft 100 (for real-emergency time, in flight simulations), according to a variety of systems and method already described above. Some differences which may occur in some embodiments are noted below.

In step 1030, the method identifies potential emergency landing airports 555 which fall within a plausible achievable landing perimeter 900 of the various selected emergency event locations 560.

In step 1040, the method identifies an exemplary aircraft flight path model. Since pre-simulation is being performed, more time may be available for calculations, and more powerful computers may be available as well. Therefore, the aircraft flight model 504.2 employed may be more detailed or more analytically complete than the simplified model which may be employed for in-flight, real-emergency-time simulation.

In steps 1050 and 1060, the method may calculate multiple simulation scenarios, taking into account various action delay times, as already described above elsewhere in this document.

In step 1070, the method may airport reachabilities 392 based on multiple simulation scenarios, taking into account various action delay times, as already described above elsewhere in this document.

Flight Emergency With Pre-Computing: As noted above, in the event of an actual low-level flight emergency, the present system and method may still employ some, most, or all of the steps of exemplary methods 390, 400, 600, 700, and 800 above; but in various embodiments, some steps of those methods may be eliminated and/or other method steps added.

In particular, at the time of an actual flight emergency, the present system and method may first identify the current emergency conditions (as for example in step 400.1 of method 400 and step 610 of method 600 above); and the search the on-board pre-computed database for simulation records with the closest, or most similar conditions (as determined by incident location, type of incident, current environmental factors, and similar considerations). In one embodiment, the present system and method may employ selection of a single one, or just a handful of, nearest-fit pre-simulations as a basis for recommending a destination airport to the pilot.

In an alternative embodiment, the present system and method may employ nearest fit simulations to narrow, limit, or constrain the simulation options/parameters for real-emergency time landing simulations, but still perform on-board simulations.

Simulated Flight Paths with Curves

In some exemplary embodiments of the present system and method discussed above, the simulations of potential emergency flight landing paths 500 are obtained via calculations which approximate the flight paths with linear segments. The use of linear segments may simplify calculations and therefore enable more flight paths 570 to be simulated. However, linear approximations may come at the cost of accuracy.

Figure 11:
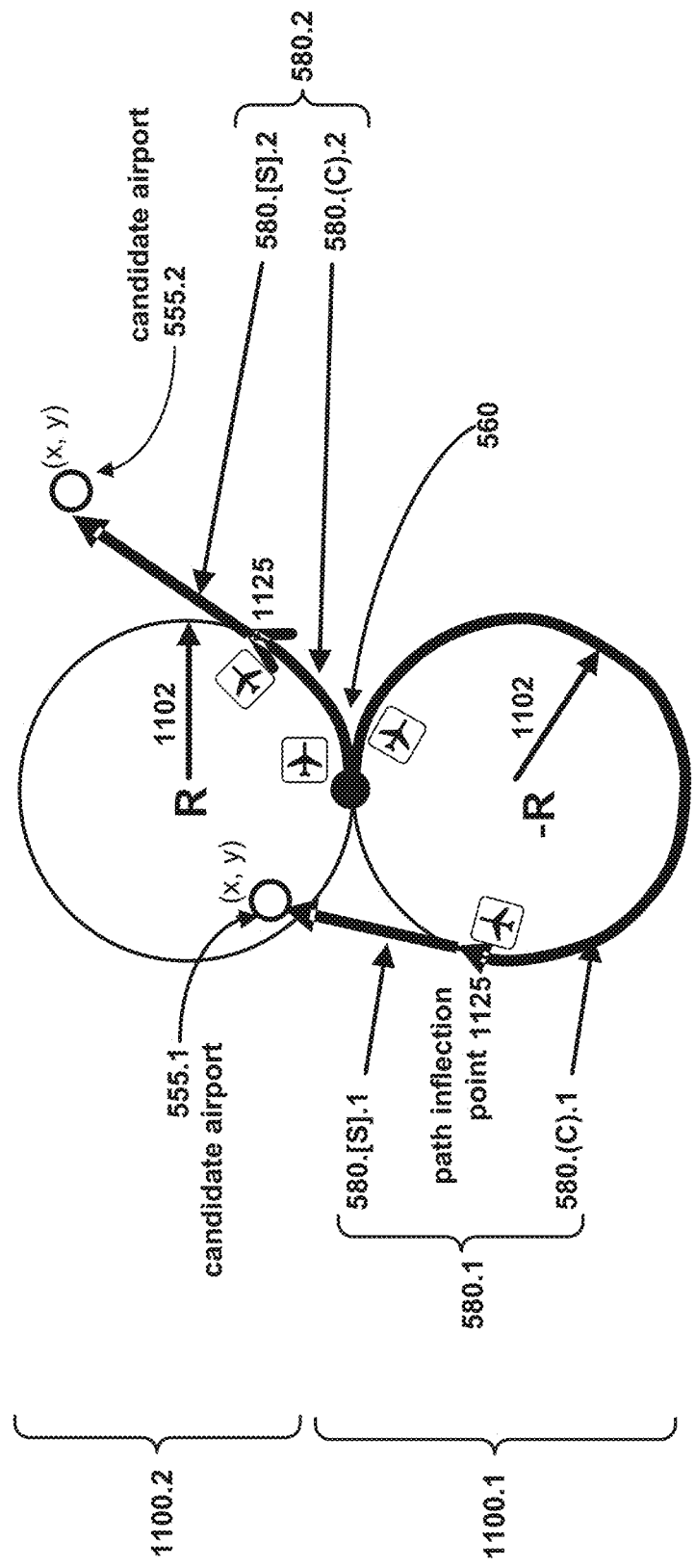
FIG. 11 illustrates some elements of an exemplary flight landing path simulation.

Alternative embodiments of the present system and method may employ flight path simulation equations which include curved or partially curved flights paths. With reference now to FIG. 11, some embodiments of the present system and may employ simulation equations representing flight paths or segments of flight paths as curved, but where the equation of curvature is that of a simple circle or circular arc of a fixed radius R. Two exemplary simulations 1100.1 and 1100.2 are illustrated in FIG. 11.

In the simulations, a flight incident 560 has occurred, and simulated flight paths are created starting from at or about the location of flight incident 560. In an embodiments, the present system and method determines a minimum radius of flight curvature R 1102. The minimum radius R 1102 is determined based on multiple factors, including the intrinsic flight capabilities of the aircraft R, restrictions on flight capabilities in view of the current aircraft conditions, and local weather/environmental conditions.

In view of the minimum radius R 1102, the present system and method may calculate a curved flight path or flight paths of a fixed curved radius R. For example, a first curved path 580.(C).1 may be formulated based on the aircraft banking to the right, while a second curved path 580.(C).2 may be formulated based on the aircraft banking to the left. (The curved path segments 580.(C) may also be referred to as "turning segments" 580.(C).)

The simulated flight path(s) 580.1, 580.2 may each continue along a constant curvature, until the simulated flight paths reach a point of path inflection 1125. A point of path inflection 1125 is determined by the exemplary method as a point where if the aircraft were to transition to a straight-line trajectory 580.[S], the flight path would be directed towards a potential nearby airport 555. At that point, the simulation completes the flight path(s) 580 with a linear segment(s) from the point of flight inflection 580.[S] to the candidate airports. In the exemplary embodiment shown, two simulated flight paths 580.1 and 580.2 are calculated; each directed towards respective candidates airports 555.1 and 555.2; and each consisting of respective path segments 580.(C).1/580.[S].1 and 580.(C).2/580.[S].2.

Wind speed: The path simulation method described immediately above, with a turning segment 580.(C) and a straight segment 580[S] may be calculated based on an assumption of minimal or zero wind speed. In an embodiment of the present system and method, a path simulation calculation may take into account the current wind speed and wind direction. In an embodiment, a simulated flight path may be arrived at via an iterative approach. An exemplary iterative approach, which is not limiting, may for example entail:

Step 1: Calculate a preliminary landing path 580 based on the basic calculations described immediately above, ignoring wind factors.

Step 2: Calculate the time to the destination airport 555 based on the preliminary landing path.

Step 3: Apply wind effects to calculate an actual end location (which may likely not be at the desired runway, or even the desired airport).

Step 4: Apply a suitable offset to the target location airport 555, and repeated steps (1) to (3) until the simulated end location (airport/runway) 555 is substantially the same as the desired target location 555.

Altitude at arrival: In an embodiment of the present system and method, the calculation of the altitude of the aircraft 100 upon arrival at a candidate target airport 555 factors into account the differences between the curved segments 580.(C) and the straight segments 580.[S] of a simulated flight path.

Inputs to calculations for simulating altitude along a simulated landing path 580 may include, for example and without limitation: aircraft thrust, draft, weight, a maximum banking angle, the current altitude, and airport altitude. When wind speed and direction are taken into account, the procedure may entail calculating separate flight times for the turning segments 580.(C) and straight segments 580.[S]. This is because drag penalty results in different rates of climb or descent for the turning segments 580.(C) versus the straight segments 580.[S]. This differences result in a difference in the distance which the plane descends along each type of segment (turning vs. straight), so that, in an exemplary embodiment, a total descent may be calculated as:

Total Descent=time-along-straight-segment*straight-segment-descent-rate+time-along-curved-segment*curved-segment-descent-rate+ (F3):

As per methods already discussed above, the simulation method may decide if the plane can reach the airport based on the remaining elevation as compared with the simulated total descent distance. (Other factors, such as fuel burn, may be taken into account to determine if the aircraft 100 can reach the airport at all.)

Extensibility/Scalability of Selection Criteria for Potential Landing Sites

In embodiments discussed elsewhere in this document, the present system and method may identify one or more airports as potential emergency landing sites; and further may prioritize those airports, based on an assessment of the safety of an attempted landing at any potential, nearby airport. In some embodiments, the safety assessments, including simulations of potential landing paths 580, maybe be performed by the Landing Options Assessments Module 305 as discussed above.

In some embodiments of the present system and method, the Landing Options Assessment Module 305 may be configured to include additional or alternative criteria for selecting or assessing potential landing sites. In accordance with well-known general conventions, laws, flight regulations, and general ethical business practice, embodiments of the present system and method will generally first consider and/or weight flight safety as the highest priority—and if an aircraft 100 is at immediate risk, in some embodiments the safety of the aircraft 100 and the people on board may be the only consideration. However, if a flight is not immediately at risk, other factors and criteria may be included in assessing potential emergency landing sites.

In one exemplary embodiment, which is not limiting, the present system and method may provide emergency landing options in the event that a medical emergency emerges during a flight. If the aircraft 100 itself is not at risk and its operations are not compromised, the present system and method may propose potential landing sites 555 both in terms of what is feasible for a landing (which may entail evaluation of simulated flight paths 580, as per discussion elsewhere in this document); and also in terms of whether medical help is available at or near the various potential landing sites 555.

Figure 12:
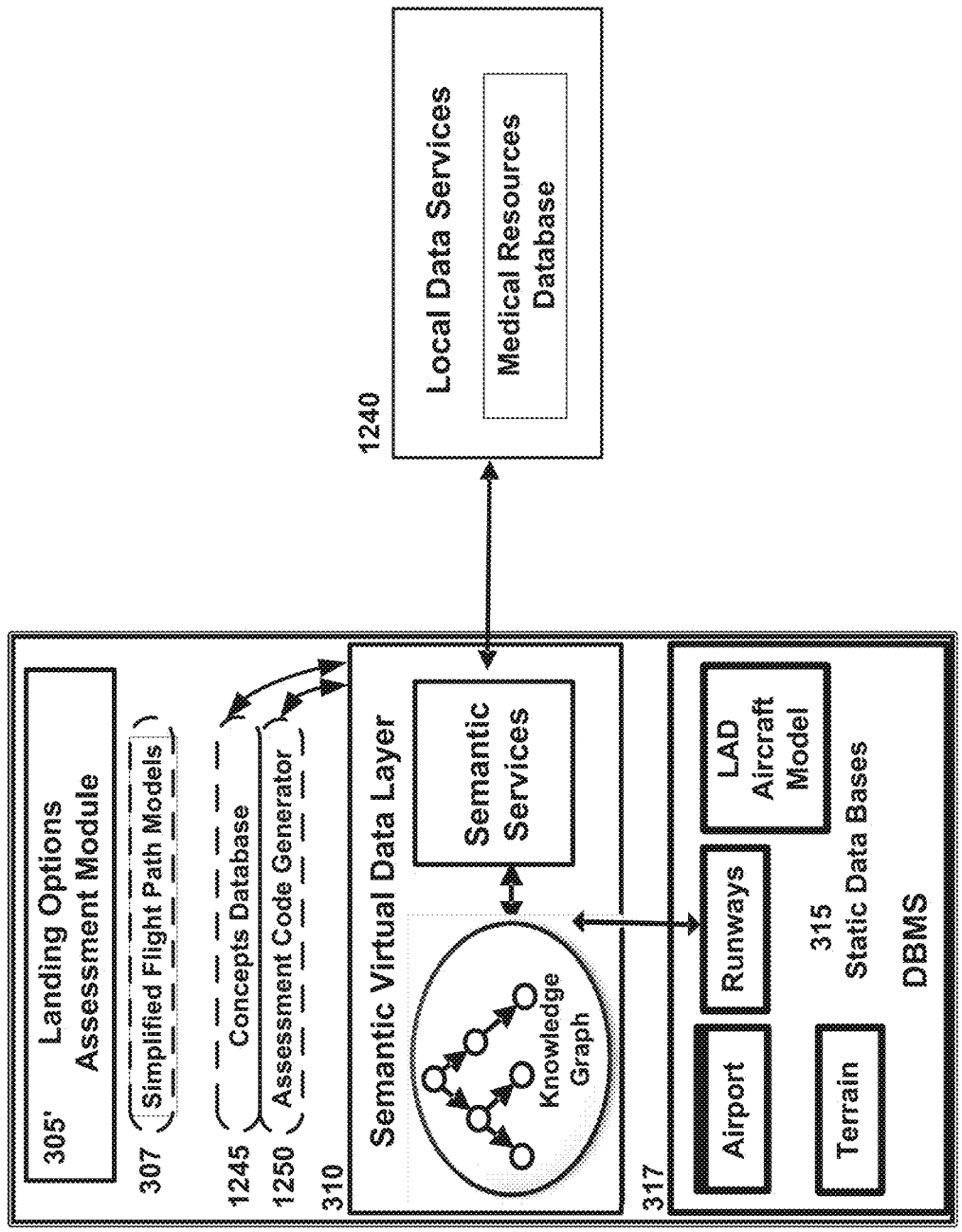
FIG. 12 presents a block diagram of an exemplary, extensible landing options assessment module.

FIG. 12 is a block diagram of an exemplary landing options assessments module (LOAD) 305' according to the present system and method. Most of the elements of LOAD 305' are the same or substantially similar to those of LOAD 305 already discussed elsewhere in this document (see FIG. 3 and associated discussion, and other figures throughout the application), and discussion of these elements will not be repeated here.

The LOAD 305' is configured for non-volatile storage of an updateable Concepts Database 1245. The user interface for the present system and method (possibly the cockpit display 260, or otherwise an administrative-level systems user interface) is configured so that airline personnel may add one or more concepts to the database, along with a listing of related requirements or data parameters. In just one example which is not limiting, an added concept may be "medical emergency", for which required data parameters may be "hospitals", "hospital locations", and similar.

For each concept, the concepts database 1245 may be updated to include subsidiary concepts with their own parameters. The concepts database 1245 may also allow for the addition and storage of code, code-fragments, priority parameters, database query language specific to different kinds of concepts, and other elements necessary to define either or both of: (i) alternative/complementary landing-choice/landing-priority criteria other than flight-path criteria or airport reachability; and (ii) suitable database queries pertinent to a given alternative/complementary criteria.

The LOAD 305' may also include an assessment code generator 1250. The assessment code generator 1250 is configured to allow the LOAD 305' to dynamically, locally generate computer code which enables assessment of landing criteria, the landing criteria being in accordance with a concept (or group of concepts) which may be added by an airline to the concepts database 1245. The details of operations of the assessment code generator 1250 are beyond the scope of this document.

In an alternative embodiment, the present system and method may not generate code based on an input of concepts. Rather, the present system and method may be configured to logically link-in object code modules (not shown in the figures) which are fully pre-coded by the airline or third-party programmers. One or more such object code modules may be configured to implement real-time priority analysis according to various criteria; such linked in code-modules may thereby supplementing the flight path analyses/landing safety criteria discussed elsewhere throughout this document.

In an embodiment of the present system and method, the concepts database 1245 and/or the code generator 1250 may be elements subsumed within the Semantic Virtual Data Layer (SVDL) 310, already discussed above. In embodiments of the present system and method, the concepts database 1245 and/or the code generator 1250 (or the separate, linked-in code modules) may, in real-time, access off-aircraft local data services 1240 (for example medical facility databases, in the case of identifying potential landing sites based on nearby medical resources). In some embodiments of the present system and method, the SVDL 310 may mediate the access (by the concepts database 1245 and associated landing assessment algorithms) to the local databases 1240.

Exemplary application: Discussed above is the exemplary application of the concepts database 1245 and code generator 1250 for implementing emergency landing criteria for in-flight medical emergencies. In another exemplary application, an airline "Galaxy Air" may decide to implement a new policy regarding crew overtime allowances for co-pilots after deviations. With the concepts database system 1245 as an element of the present system and method, Galaxy Air may (in accordance with the new policy) alter the maximum shift time after deviations, as a parameter which may be stored (and updated by Galaxy Air) in the concepts database.

Via such an extension, the present system and method may be able to process a query such as: "Can we complete our flight after landing and refueling at alternative airport XYZ?" In one embodiment, such a query may be added to the system by the Galaxy Air as part of the concepts database; in an alternative embodiment, the query may be presented in real-time, during an emergency, for example by an aircraft pilot presenting a voice query to the system. (Such a pilot initiated query may be realistic, for example, if the weather at the intended destination ABC is inclement and temporarily does not allow a safe landing at ABC.)

In an embodiment, when such a query is presented, the LOAD 305' may map the question to a deviation completion concept which lists, among other issues to consider, the maximum allowed time of work for all crew and cabin personnel. This sub-concept would then automatically creates data queries to various databases 1240 (one having data on what crew and cabin members are on board, another with each staff member's schedule, and a third database that holds the rules for maximum flight times for staff in different roles). The LOAD 305' would then compute and compare the maximum flight time allowed for the co-pilot and her actual flight time after deviating to airport XYZ; refueling; and then completing the flight to the final destination ABC.

CONCLUSION

The present disclosure is directed in part towards systems and methods to employ a computational system to quickly identify potential landing sites in the event a flight emergency forces an unexpected, low-level landing by an aircraft. The disclosure is further directed towards identifying, in real-emergency time, probabilities of successful landings at various potential emergency landing sites. Presented herein above, in various embodiments, are exemplary systems and methods directed towards achieving these objectives.

Elements of different embodiments may be combined in various embodiments not specifically enumerated herein, and in some cases some elements may be omitted, within the scope of the appended claims. Alternative embodiments, examples, and modifications which would still be encompassed by the disclosure may be made by those skilled in the art, particularly in light of the foregoing teachings. Further, it should be understood that the terminology used to describe the disclosure is intended to be in the nature of words of description rather than of limitation.

Those skilled in the art will also appreciate that various adaptations and modifications of the preferred and alternative embodiments described above can be configured without departing from the scope and spirit of the disclosure. Therefore, it is to be understood that, within the scope of the appended claims, the disclosure may be practiced other than as specifically described herein.

What is claimed is:

1. A computer-readable, non-transitory storage medium storing instructions that, when executed by a digital controller of an aircraft during a flight emergency situation, causes the digital controller to execute a method comprising:
   receiving an indication from a sensor of the aircraft that a flight emergency has occurred;
   obtaining real-time aircraft data and real-time environmental data;
   identifying a plurality of potential landing sites suitable for an emergency landing of the aircraft;
   generating at least one simplified flight path simulation model based on the real-time aircraft data and the real-time environmental data, the at least one simplified flight path simulation model including a series of linear segments configured to assess a plurality of flight landing probabilities for a potential landing site of the plurality of potential landing sites;
   for the potential landing site of the plurality of potential landing sites, calculating a simulated flight path for the aircraft to travel from a current location of the aircraft to the potential landing site, based on the at least one simplified flight path simulation model; and
   for the potential landing site of the plurality of potential landing sites, identifying for the simulated flight path a probability of the aircraft achieving a safe landing at the potential landing site, based on the at least one simplified flight path simulation model.

2. The computer-readable, non-transitory storage medium of claim 1, wherein the method further comprises:
   presenting the potential landing site of the plurality of landing sites and the probability via a cockpit communications system.

3. The computer-readable, non-transitory storage medium of claim 1, wherein the method further comprises:
   for the potential landing site, periodically updating a calculation of the simulated flight path for the aircraft to travel from an updated current location of the aircraft to the potential landing site; and
   for the potential landing site, periodically updating for the simulated flight path the probability of the aircraft achieving a safe landing at the respective potential landing site.

4. The computer-readable, non-transitory storage medium of claim 1, wherein the method further comprises:
   identifying a plurality of potential landing sites for the emergency landing of the aircraft;
   for each respective potential landing site of the plurality of potential landing sites, simulating a respective simulated flight path for the aircraft to travel from the current location of the aircraft to the respective potential landing site; and
   for each respective potential landing site, identifying for the respective simulated flight path a respective probability of the aircraft achieving a safe landing at the respective potential landing site.

5. The computer-readable, non-transitory storage medium of claim 1, wherein identifying the potential landing site suitable for the emergency landing of the aircraft comprises:

determining a plausible achievable landing perimeter (PALP) from a present location of the aircraft; and identifying as potential landing sites of the plurality of landing sites, one or more airports within a plausible achievable landing perimeter.

6. The computer-readable, non-transitory storage medium of claim 1, wherein the
at least one simplified flight path simulation model is further configured to calculate multiple alternative flight paths to multiple alternative destination airports within a time span of at most ten seconds.

7. The computer-readable, non-transitory storage medium of claim 1, wherein
the at least one simplified flight path simulation model is based on at least one of: a fixed current aircraft thrust; a fixed current wind speed; a fixed current wind orientation; and a simulated flight path constructed based on linear path segments.

8. The computer-readable, non-transitory storage medium of claim 1, wherein identifying the probability of the aircraft achieving a safe landing at the respective potential landing site comprises:
for a selected airport, generating a plurality of flight scenarios for multiple different environmental conditions or aircraft conditions;
for the selected airport, generating a plurality of distinct landing flight path simulations for the respective plurality of flight scenarios;
for each distinct flight path simulation of the plurality of distinct flight path simulations, determining if the simulated flight path is viable with respect to a safe landing at a destination airport; and
generating the probability of the safe landing at the destination airport based on a plurality of viability determinations for the plurality of distinct landing flight path simulations.

9. The computer-readable, non-transitory storage medium of claim 1, wherein the method further comprises pre-calculating prior to any emergency situation at least one simulated flight path for the emergency landing.

10. A method comprising:
receiving an indication that a flight emergency has occurred in a digital computational system on board an aircraft
obtaining real-time aircraft data and real-time environmental data;
identifying via a processor of the digital computational system a plurality of potential landing sites suitable for an emergency landing of the aircraft, wherein a potential landing site of the plurality of potential landing sites is selected from among a list of landing sites stored in a memory, of the digital computational system;
generating at least one simplified flight path simulation model based on the real-time aircraft data and the real-time environmental data, the at least one simplified flight path simulation model including a series of linear segments configured to assess a plurality of flight landing probabilities for the potential landing site of the plurality of potential landing sites;
for the potential landing site of the plurality of potential landing sites, calculating via the processor a simulated flight path for the aircraft to travel from a current location of the aircraft to the potential landing site, based on the at least one simplified flight path simulation model; and for the potential landing site of the plurality of potential landing sites, identifying via the processor and for the simulated flight path a probability of the aircraft achieving a safe landing at the respective potential landing site, based on the at least one simplified flight path simulation model.

11. The method of claim 10, further comprising:
presenting the potential landing site of the plurality of potential landing sites and the probability via a cockpit communications system of the aircraft.

12. The method of claim 10, further comprising:
for the potential landing site, periodically updating a calculation of the simulated flight path for the aircraft to travel from an updated current location of the aircraft to the potential landing site; and
for the potential landing site, periodically updating for the simulated flight path the probability of the aircraft achieving a safe landing at the respective potential landing site.

13. The method of claim 10, further comprising:
identifying a plurality of potential landing sites for the emergency landing of the aircraft;
for each respective potential landing site of the plurality of potential landing sites, simulating a respective simulated flight path for the aircraft to travel from the current location of the aircraft to the respective potential landing site; and
for each respective potential landing site, identifying for the respective simulated flight path a respective probability of the aircraft achieving a safe landing at the respective potential landing site.

14. The method of claim 10, wherein identifying the potential landing site suitable for the emergency landing of the aircraft comprises:
determining a plausible achievable landing perimeter (PALP) from a present location of the aircraft; and
identifying as potential landing sites of the plurality of landing sites, one or more airports within a plausible achievable landing perimeter.

15. The method of claim 10, wherein
the at least one simplified flight path simulation model is further configured to calculate multiple alternative flight paths to multiple alternative destination airports within a time span of at most one minute.

16. The method of claim 10, wherein
the at least one simplified flight path simulation model is based on at least one of: a fixed current aircraft thrust; a fixed current wind speed; a fixed current wind orientation; and a simulated flight path constructed based on linear path segments.

17. The method of claim 10, wherein identifying the probability of the aircraft achieving a safe landing at the respective potential landing site comprises:
for a selected airport, generating a plurality of flight scenarios for multiple different environmental conditions or aircraft conditions;
for the selected airport, generating a plurality of distinct landing flight path simulations for the respective plurality of flight scenarios;
for each distinct landing flight path simulation of the plurality of distinct landing flight path simulations, determining if the simulated flight path is viable with respect to a safe landing at a destination airport; and
generating the probability of the safe landing at the destination airport based on a plurality of viability determinations for the plurality of distinct landing flight path simulations.

18. The method of claim 10, wherein the method further comprises pre-calculating prior to any emergency situation at least one simulated flight path for the emergency landing.

19. For use in an aircraft, a controller comprising a hardware processor configured to:
- receive an indication from an aircraft sensor that a flight emergency has occurred;
- obtain real-time aircraft data and real-time environmental data;
- identify a plurality of potential landing sites for an emergency landing of the aircraft;
- generate at least one simplified flight path simulation model based on the real-time aircraft data and the real-time environmental data, the at least one simplified flight path simulation model including a series of linear segments configured to assess a plurality of flight landing probabilities for the plurality of potential landing sites;
- for each respective potential landing site of the plurality of potential landing sites, simulate a plurality of site-specific simulated flight paths for the aircraft to travel from a current location of the aircraft to the respective potential landing site, based on the at least one simplified flight path simulation model; and
- for each potential landing site, identify from the plurality of site-specific simulated flight paths a probability of the aircraft achieving a safe landing at each respective potential landing site, based on the at least one simplified flight path simulation model.

20. The controller of claim 19, wherein the hardware processor is further configured to:
- present each potential landing site of the plurality of landing sites and the probability via a cockpit communications system.

* * * * *